United States Patent
Christmas

(10) Patent No.: US 11,782,133 B2
(45) Date of Patent: *Oct. 10, 2023

(54) HOLOGRAPHIC LIGHT DETECTION AND RANGING

(71) Applicant: Envisics Ltd., Milton Keynes (GB)

(72) Inventor: Jamieson Christmas, Milton Keynes (GB)

(73) Assignee: Envisics Ltd, Milton (GB)

( * ) Notice: Subject to any disclaimer, the term of this patent is extended or adjusted under 35 U.S.C. 154(b) by 919 days.

This patent is subject to a terminal disclaimer.

(21) Appl. No.: 16/479,464

(22) PCT Filed: Jan. 19, 2018

(86) PCT No.: PCT/GB2018/050168
§ 371 (c)(1),
(2) Date: Jul. 19, 2019

(87) PCT Pub. No.: WO2018/134618
PCT Pub. Date: Jul. 26, 2018

(65) Prior Publication Data
US 2019/0383914 A1    Dec. 19, 2019

(30) Foreign Application Priority Data

Jan. 19, 2017 (GB) ..................................... 1700901
Jan. 19, 2017 (GB) ..................................... 1700902
Jan. 19, 2017 (GB) ..................................... 1700903

(51) Int. Cl.
*G01S 7/481* (2006.01)
*G01S 17/42* (2006.01)
(Continued)

(52) U.S. Cl.
CPC .......... *G01S 7/4814* (2013.01); *G01S 7/4815* (2013.01); *G01S 7/4817* (2013.01); *G01S 17/42* (2013.01);
(Continued)

(58) Field of Classification Search
CPC .............................. G01S 7/4814; G01S 7/4815
See application file for complete search history.

(56) References Cited

U.S. PATENT DOCUMENTS 10,061,266 B2    8/2018   Christmas et al.
2011/0026007 A1*  2/2011  Gammenthaler ....... G01S 17/89
                                                    356/28
(Continued)

FOREIGN PATENT DOCUMENTS

JP    2016-126122 A    7/2016

OTHER PUBLICATIONS

International Search Report for PCT/GB2018/050168 dated Apr. 24, 2018, 3 pages.
(Continued)

*Primary Examiner* — Jerry T Jean Baptiste
(74) *Attorney, Agent, or Firm* — MCDONNELL BOEHNEN HULBERT & BERGHOFF LLP

(57) ABSTRACT

A light detection and ranging system arranged to scan a scene comprises a light source arranged to output light having a first characteristic. A spatial light modulator is arranged to receive the light from the light source and output spatially-modulated light in accordance with computer-generated holograms represented thereon. A holographic controller is arranged to output a plurality of holograms to the spatial light modulator. Each hologram is arranged to form a corresponding light footprint within the scene. The holographic controller is further arranged to change the position of the light footprint within the scene. A light detector is (Continued)

arranged to receive light having the first characteristic from the scene and output a light response signal. In embodiments, a first plurality of holograms are arranged to provide a first scan within the scene, and the holographic controller is arranged to receive the light response signal in response to the first scan and determine a second plurality of holograms based on a property of the light response signal.

22 Claims, 16 Drawing Sheets

(51) Int. Cl.
*G01S 17/931* (2020.01)
*G01S 17/89* (2020.01)
*G01S 7/484* (2006.01)

(52) U.S. Cl.
CPC ............ *G01S 17/89* (2013.01); *G01S 17/931* (2020.01); *G01S 7/484* (2013.01)

(56) References Cited

U.S. PATENT DOCUMENTS

| 2012/0050528 | A1* | 3/2012 | Davies | G01C 11/02 |
| | | | | 348/136 |
| 2013/0182239 | A1* | 7/2013 | Kaiser | G01S 17/88 |
| | | | | 356/4.01 |
| 2015/0009695 | A1 | 1/2015 | Christmas et al. | |
| 2016/0245902 | A1* | 8/2016 | Watnik | G01S 7/4815 |
| 2017/0003392 | A1* | 1/2017 | Bartlett | G01S 17/10 |

OTHER PUBLICATIONS

Co-pending U.S. Appl. No. 16/479,468, filed Jul. 19, 2019.
Co-pending U.S. Appl. No. 16/265,667, filed Feb. 1, 2019.

* cited by examiner

HOLOGRAPHIC LIGHT DETECTION AND RANGING

FIELD

The present disclosure relates to a light projector. More specifically, the present disclosure relates to a holographic projector, holographic projection system, a method of controlling a projector and a method of controlling a holographic projection system. Embodiments relate to a light detection and ranging system. Some embodiments relate to a method of light detection and ranging. Some embodiments relate to a method of controlling the light footprint in a light detection and ranging system. Some embodiments relate to a method of scanning a scene with a computer-controlled light footprint.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous.

Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

SUMMARY

Aspects of an invention are defined in the appended independent claims.

There is provided a method of light detection and ranging comprising illuminating a scene with spatially modulated light by outputting a plurality of computer-generated holograms to a spatial light modulator and illuminating the spatial light modulator with light having a first characteristic. Each hologram is arranged to form a corresponding light footprint within the scene. The method may further comprise moving the light footprint within the scene. The method may also comprise receiving reflected spatially modulated light from the scene.

In accordance with the present disclosure, the light footprint may make discrete movements from one part of the scene to another part of the scene. In particular, the light footprint may be instantaneously repositioned within the scene. It may be said that the light footprint jumps from a first point in the scene to a second point in the scene. This achieved by using dynamic holography to form the light footprint. The method may be used to dynamically change the size, shape, orientation and/or position of the light footprint.

The method may further comprise moving the spatially modulated light back and forth between two or more areas of the scene in order to perform an interleaved scan of two or more areas of the scene.

The method may further comprise intelligent scanning of the scene in which feedback from a light detector is used to determine how and where to perform the next scan. This may comprise selecting at least one computer-generated hologram from a memory or calculating at least one computer-generated hologram including calculating at least one computer-generated hologram in real-time based on a received signal.

The term "light footprint" is used herein to refer to the illumination pattern formed in the scene by each hologram. The light footprint is therefore an area of light within the scene. The light may be pulsed. The light may have uniform brightness across its area. The light footprint may be characterised by its size, shape and orientation. The light detection and ranging system disclosed herein may be used to form a temporal sequence of varying and/or moving light footprints within a scene. Advantageously, the dynamically-reconfigurable holographic technique disclosed herein may be used to control parameters of the light footprint and the position of the light footprint in real-time.

The term "hologram" is used to refer to the recording which contains amplitude and/or phase information about the object. The term "holographic reconstruction" is used to refer to the optical reconstruction of the object which is formed by illuminating the hologram. The term "replay field" is used to refer to the plane in space where the holographic reconstruction is formed.

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

The term "light" is used herein in its broadest sense. Embodiments are equally applicable to visible light, infrared light and ultraviolet light, and any combination thereof.

Embodiments describe monochromatic light footprints by way of example only. In embodiments, the light footprint is a polychromatic light footprint. In embodiments, a composite colour light footprint is provided by combining a plurality of single colour light footprints. In embodiments, a plurality of single colour computer-generated holograms may be used to form each composite colour light footprint. Such wavelength diversity can increase throughput.

Embodiments describe 1D and 2D light footprints by way of example only. In other embodiments, the light footprint is a 3D light footprint. That is, in embodiments, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF THE DRAWINGS

The present invention is not restricted to the embodiments described in the following but extends to the full scope of the appended claims. That is, the present invention may be embodied in different forms and should not be construed as limited to the described embodiments.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Embodiments may be carried out independently from each other, or may be carried out together in co-dependent relationship.

It has been found that a holographic reconstruction of acceptable quality can be formed from a "hologram" containing only phase information related to the original object. Such a holographic recording may be referred to as a phase-only hologram. Embodiments relate to phase-only holography by way of example only. That is, in embodiments, the spatial light modulator applies only a phase-delay distribution to incident light. In embodiments, the phase delay applied by each pixel is multi-level. That is, each pixel may be set at one of a discrete number of phase levels.

Figure 1:
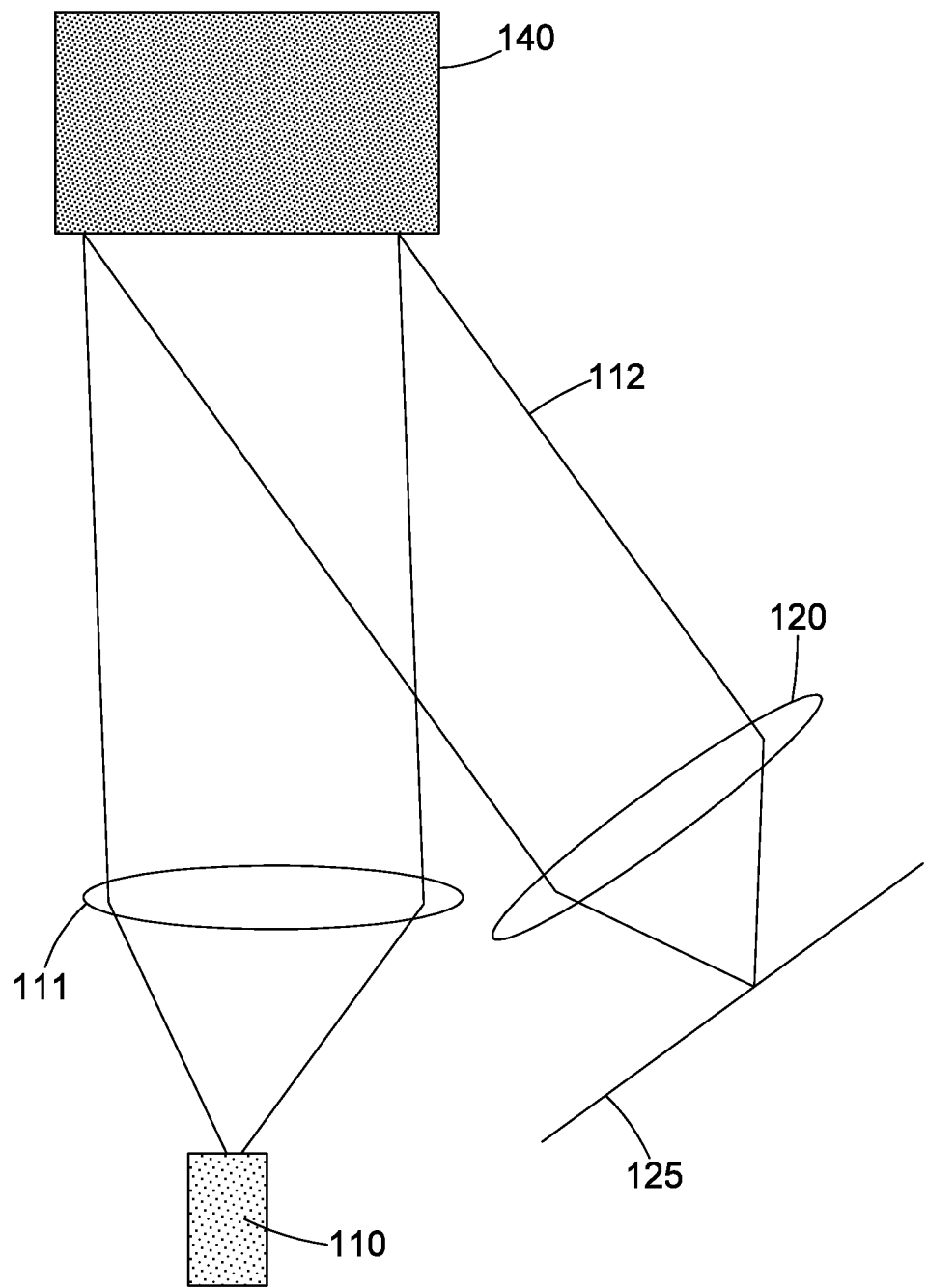
FIG. 1 is a schematic showing a reflective SLM producing a holographic reconstruction on a screen.

In embodiments, the computer-generated hologram is a Fourier transform of the object for reconstruction. In these embodiments, it may be said that the hologram is a Fourier domain or frequency domain representation of the object. FIG. 1 shows an embodiment using a reflective SLM to display a phase-only Fourier hologram and produce a holographic reconstruction at a replay field.

A light source 110, for example a laser or laser diode, is disposed to illuminate the SLM 140 via a collimating lens 111. The collimating lens causes a generally planar wavefront of light to be incident on the SLM. The direction of the wavefront is off-normal (e.g. two or three degrees away from being truly orthogonal to the plane of the transparent layer). The arrangement is such that light from the light source is reflected off a mirrored rear surface of the SLM and interacts with a phase-modulating layer to form an exit wavefront 112. The exit wavefront 112 is applied to optics including a Fourier transform lens 120, having its focus at a screen 125. The Fourier transform lens 120 receives a beam of phase-modulated light from the SLM and performs a frequency-space transformation to produce a holographic reconstruction at the screen 125.

Light is incident across the phase-modulating layer (i.e. the array of phase modulating elements) of the SLM. Modulated light exiting the phase-modulating layer is distributed across the replay field. Notably, in this type of holography, each pixel of the hologram contributes to the whole reconstruction. That is, there is not a one-to-one correlation between specific points on the replay image and specific phase-modulating elements.

In these embodiments, the position of the holographic reconstruction in space is determined by the optical power of the Fourier transform lens. In the embodiment shown in FIG. 1, the Fourier transform lens is a physical lens. That is, the Fourier transform lens is an optical Fourier transform lens and the Fourier transform is performed optically. However, in other embodiments, the Fourier transform is performed computationally by including lensing data in the holographic data. That is, the hologram includes data representative of a lens as well as data representing the object.

It is known in the field of computer-generated hologram how to calculate holographic data representative of a lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In embodiments, lensing data is combined with the holographic data by simple vector addition. Alternatively, in other embodiments, the Fourier transform lens is omitted such that the holographic reconstruction takes place in the far-field. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide beam steering of an amplitude-only hologram.

A Fourier hologram of a 2D image may be calculated in a number of ways, including using algorithms such as the Gerchberg-Saxton algorithm. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only Fourier transform of the object may be calculated.

In embodiments, a computer-generated hologram is calculated from amplitude information using the Gerchberg-Saxton algorithm or a variation thereof. The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

In embodiments, the hologram is calculated using an algorithm based on the Gerchberg-Saxton algorithm such as described in British patent 2,498,170 or 2,501,112 which are hereby incorporated in their entirety by reference.

In accordance with embodiments, an algorithm based on the Gerchberg-Saxton algorithm retrieves the phase information $\psi[u,v]$ of the Fourier transform of the data set which gives rise to a known amplitude information T[x,y]. Amplitude information T[x,y] is representative of a target image (e.g. a photograph). The phase information $\psi[u,v]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

Figure 2A:
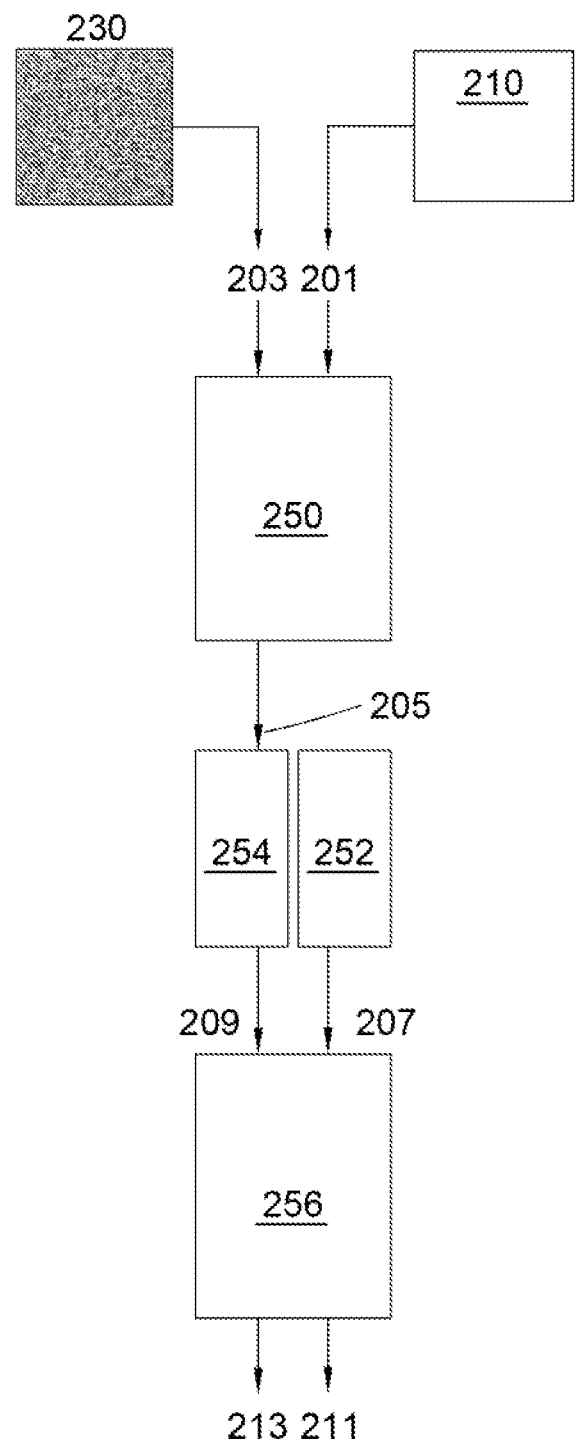
FIG. 2A illustrates a first iteration of an example Gerchberg-Saxton type algorithm.
Figure 2B:
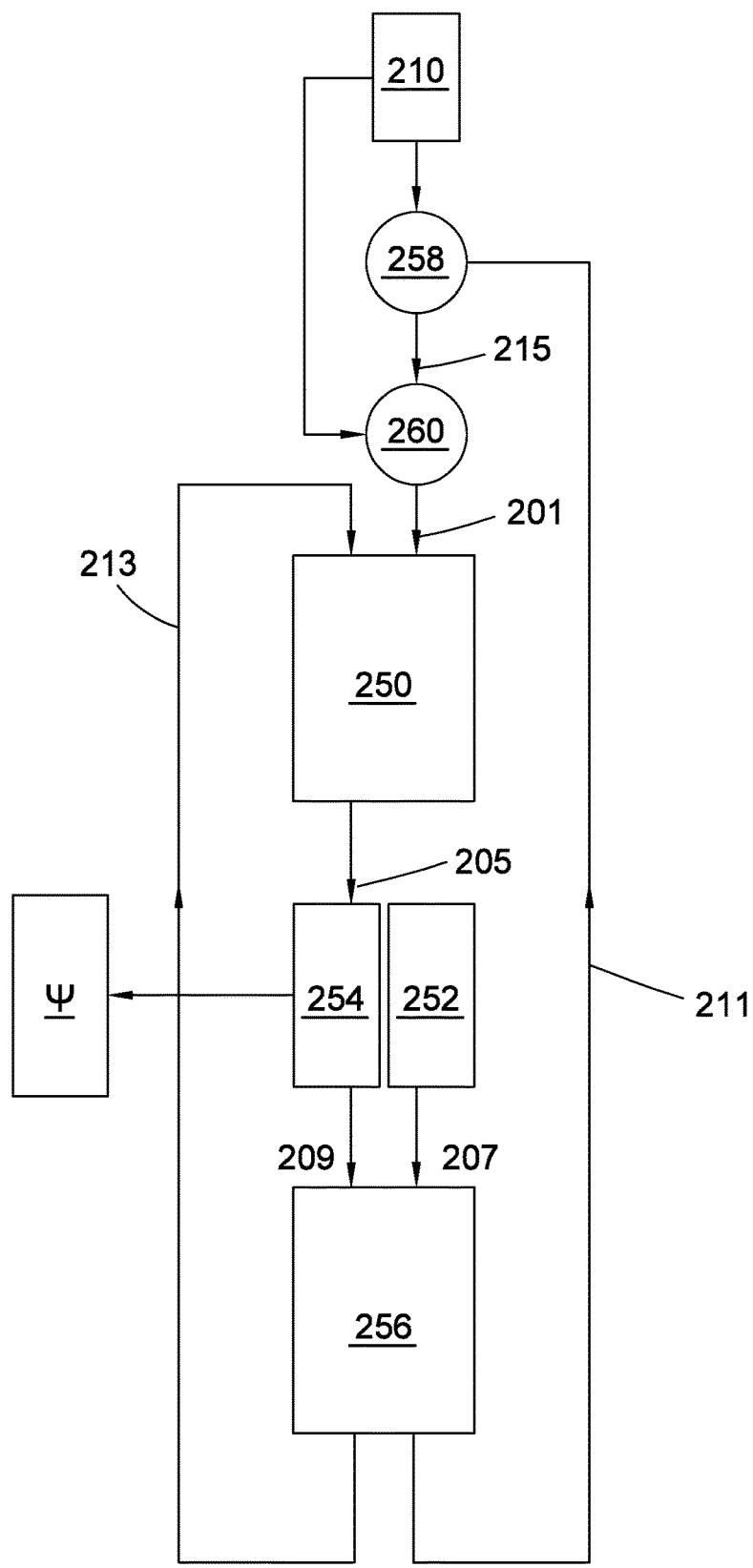
FIG. 2B illustrates the second and subsequent iterations of the example Gerchberg-Saxton type algorithm.

An example algorithm based on the Gerchberg-Saxton algorithm in accordance with embodiments of the present disclosure is described in the following with reference to FIG. 2. The algorithm is iterative and convergent. The algorithm is arranged to produce a hologram representing an input image. The algorithm may be used to determine an amplitude-only hologram, a phase-only hologram or a fully complex hologram. Example disclosed herein relate to producing a phase-only hologram by way of example only. FIG. 2A illustrates the first iteration of the algorithm and represents the core of the algorithm. FIG. 2B illustrates subsequent iterations of the algorithm.

For the purpose of this description, the amplitude and phase information are considered separately although they are intrinsically combined to form a composite complex data set. With reference to FIG. 2A, the core of the algorithm can be considered as having an input comprising first complex data and an output comprising a fourth complex data. First complex data comprises a first amplitude component 201 and a first phase component 203. Fourth complex data comprises a fourth amplitude component 211 and a fourth phase component 213. In this example, the input image is two-dimensional. The amplitude and phase information are therefore functions of the spatial coordinates (x,y) in the farfield image and functions of (u,v) for the hologram field. That is, the amplitude and phase at each plane are amplitude and phase distributions at each plane.

In this first iteration, the first amplitude component 201 is the input image 210 of which the hologram is being calculated. In this first iteration, the first phase component 203 is a random phase component 230 merely used as a starting point for the algorithm. Processing block 250 performs a Fourier transform of the first complex data to form second complex data having a second amplitude component (not shown) and a second phase information 205. In this example, the second amplitude component is discarded and replaced by a third amplitude component 207 by processing block 252. In other examples, processing block 252 performs different functions to produce the third amplitude component 207. In this example, the third amplitude component 207 is a distribution representative of the light source. Second phase component 205 is quantised by processing block 254 to produce third phase component 209. The third amplitude component 207 and third phase component 209 form third complex data. The third complex data is input to processing block 256 which performs an inverse Fourier transform. Processing block 256 outputs fourth complex data having the fourth amplitude component 211 and the fourth phase component 213. The fourth complex data is used to form the input for the next iteration. That is, the fourth complex data of the nth iteration is used to form the first complex of the (n+1)th iteration.

FIG. 2B shows second and subsequent iterations of the algorithm. Processing block 250 receives first complex data having a first amplitude component 201 derived from the fourth amplitude component 211 of the previous iteration and a first phase component 213 corresponding to the fourth phase component of the previous iteration.

In this example, the first amplitude component 201 is derived from the fourth amplitude component 211 of the previous iteration as described in the following. Processing block 258 subtracts the input image 210 from the fourth amplitude component 211 of the previous iteration to form fifth amplitude component 215. Processing block 260 scales the fifth amplitude component 215 by a gain factor $\alpha$ and subtracts it from the input image 210. This is expressed mathematically by the following equations:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

Where:
F' is the inverse Fourier transform;
F if the forward Fourier transform;
R is the replay field;
T is the target image;
$\angle$ is the angular information;
$\psi$ is the quantized version of the angular information;
$\varepsilon$ is the new target magnitude, $\varepsilon \geq 0$; and
$\alpha$ is a gain element~1.

The gain element $\alpha$ may be fixed or variable. In examples, the gain element $\alpha$ is determined based on the size and rate of the incoming target image data.

Processing blocks 250, 252, 254 and 256 function as described with reference to FIG. 2A. In the final iteration, a phase-only hologram $\psi(u, v)$ representative of the input image 210 is output. It may be said that the phase-only hologram $\psi(u, v)$ comprises a phase distribution in the frequency or Fourier domain.

In other examples, the second amplitude component is not discarded. Instead, the input image 210 is subtracted from the second amplitude component and a multiple of that amplitude component is subtracted from the input image 210 to produce the third amplitude component 307. In other examples, the fourth phase component is not fed back in full and only a portion proportion to its change over, for example, the last two iterations is fed back.

In embodiments, there is provided a real-time engine arranged to receive image data and calculate holograms in real-time using the algorithm. In embodiments, the image data is a video comprising a sequence of image frames. In other embodiments, the holograms are pre-calculated, stored in computer memory and recalled as needed for display on a SLM. That is, in embodiments, there is provided a repository of predetermined holograms.

However, embodiments relate to Fourier holography and Gerchberg-Saxton type algorithms by way of the example only. The present disclosure is equally applicable to Fresnel holography and holograms calculated by other techniques such as those based on point cloud methods.

The present disclosure may be implemented using any one of a number of different types of SLM. The SLM may output spatially modulated light in reflection or transmission. In embodiments, the SLM is a liquid crystal on silicon, "LCOS", SLM but the present disclosure is not restricted to this type of SLM.

A LCOS device is capable of displaying large arrays of phase only elements in a small aperture. Small elements (typically approximately 10 microns or smaller) result in a practical diffraction angle (a few degrees) so that the optical system does not require a very long optical path. It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field. Using a silicon backplane has the advantage that the pixels are optically flat, which is important for a phase modulating device.

Figure 3:
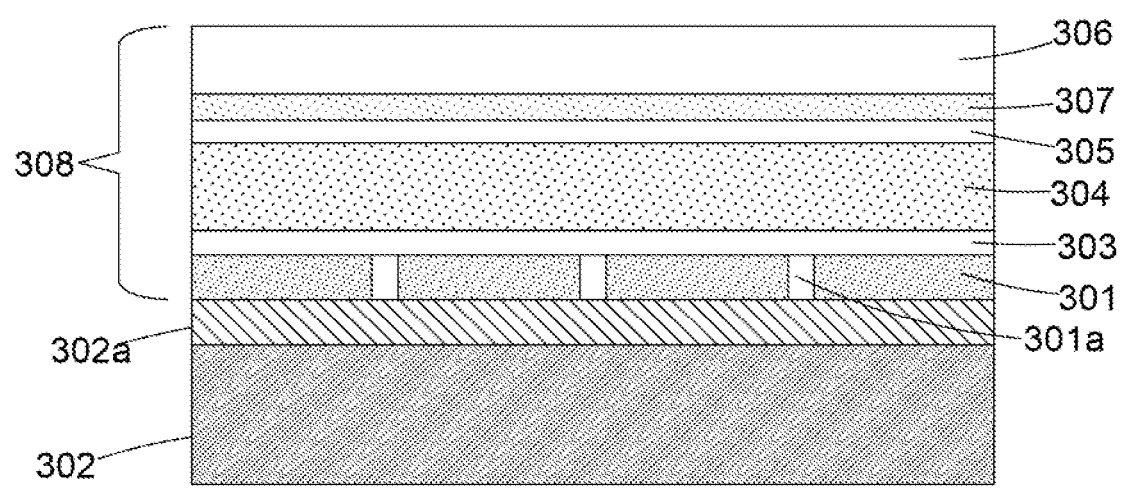
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection but the present disclosure is equally applicable to a transmissive LCOS SLM. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key point for projection of moving video images).

The inventor has previously disclosed various methods for providing improved image projection using the holographic technique of the present disclosure. The inventor recognised that this holographic technique may also be used to form the basis of an improved LIDAR system. Specifically, the inventor recognised that the technique may be used to write a sequence of computer-generated holograms to a spatial light modulator which scan a light footprint across a scene as required for LIDAR. Advantageously, the position of the light footprint within the scene may be changed by changing the computer-generated hologram. It may be understood how a light detector may be synchronised with the light source and spatial light modulator in order to provide light detection and ranging. The light has a first characteristic which means it may be distinguished from other light received by the detector. The light may be pulsed and temporally synchronised with the sequence of holograms. In embodiments, the first characteristic is amplitude modulation at a first frequency. However, the light may be characterised in any other ways. In embodiments, the first frequency is a radio frequency.

First Group of Embodiments

Figure 4:
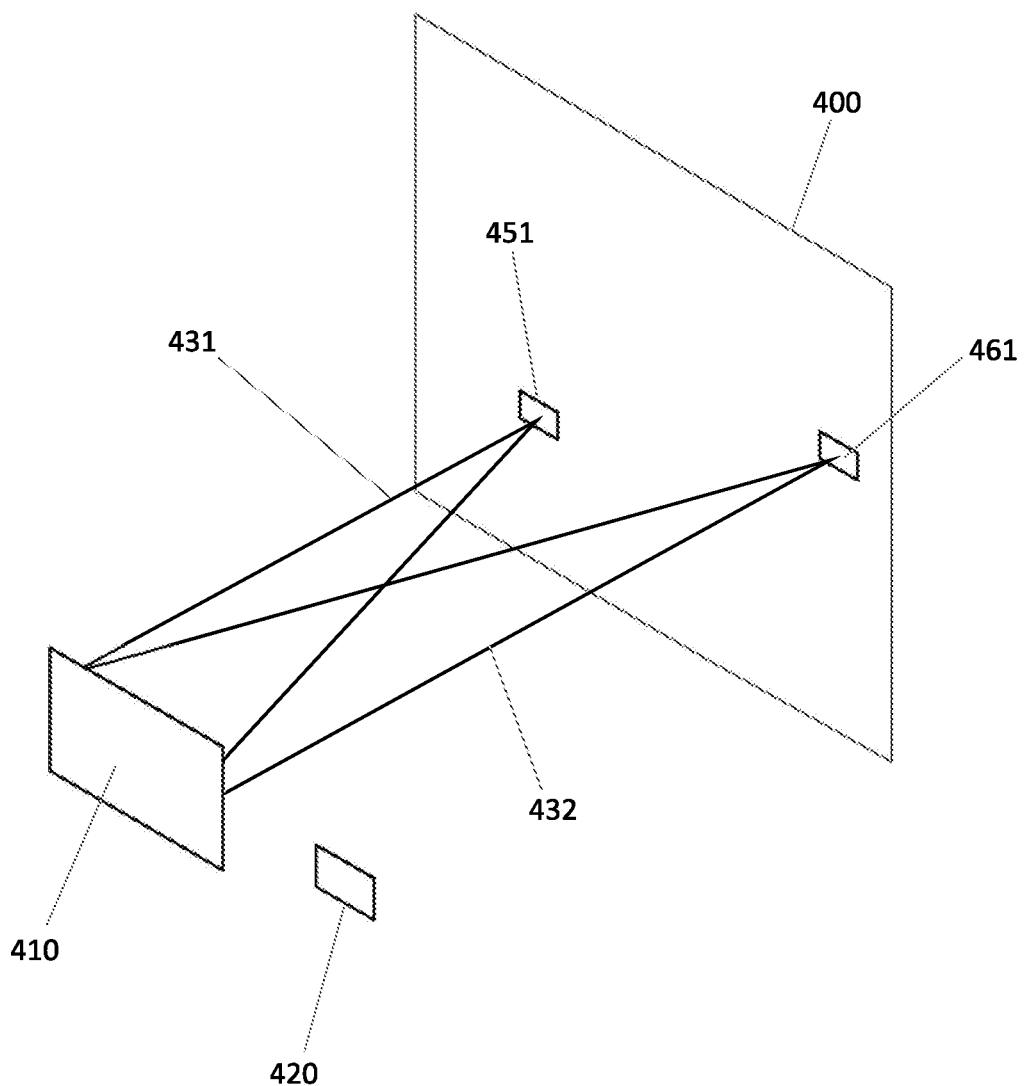
FIG. 4 shows a LIDAR system in accordance with embodiments.

FIG. 4 shows an embodiment comprising a spatial light modulator 410 arranged to direct light to a scene 400 and a light detector 420 arranged to collected reflected light from the scene. Spatial light modulator 410 is arranged to receive light from a light source (not shown) and output spatially modulated light in accordance with a dynamically-variable computer-generated hologram represented on the spatial light modulator 410. FIG. 4 shows the spatial light modulator 410 outputting first spatially modulated light 431 forming a first light footprint 451 in the scene 400 in accordance with a first computer-generated hologram (not shown) represented on the spatial light modulator 410. FIG. 4 also shows the spatial light modulator 410 outputting second spatially modulated light 432 forming a second light footprint 461 in the scene 400 in accordance with a second computer-generated hologram (not shown) represented on the spatial light modulator 410.

The first computer-generated hologram and second computer-generated hologram are displayed on the spatial light modulator at different times in order to provide scanning. The spatial light modulator receives a sequence of computer-generated holograms from a holographic controller (not shown) in order to form a corresponding temporal sequence of light footprints within the scene.

In some embodiments, the brightness of the light footprint is substantially uniform across its area. In other embodiments, the brightness of the light footprint is changed depending upon distance from the spatial light modulator (i.e. range). For example, the brightness of light footprint may increase with distance from the spatial light modulator. In an embodiment, a first light footprint having a first brightness is formed at a first distance from the spatial light modulator and a second footprint having a second brightness is formed at a second distance from the spatial light modulator, wherein the first distance is greater than the second distance and the first brightness is greater than the second brightness. The first light footprint and second light footprint may be formed at substantially the same time or they may be formed at different times. In an embodiment, the first light footprint and second light footprint are successive light footprints of a temporal sequence of light footprints within the scene.

There is therefore provided a light detection and ranging, "LIDAR", system arranged to scan a scene, the system comprising: a light source arranged to output light having a first characteristic; a spatial light modulator arranged to receive the light from the light source and output spatially-modulated light in accordance with computer-generated holograms represented on the spatial light modulator; a holographic controller arranged to output a plurality of computer-generated holograms to the spatial light modulator, wherein each computer-generated hologram is arranged to form a corresponding light footprint within the scene and the holographic controller is further arranged to change the position of the light footprint within the scene; and a light detector arranged to receive light having the first characteristic from the scene and output a light response signal.

The holographic controller is arranged to move the light footprint by changing the holographic pattern displayed on the spatial light modulator. In embodiments, the plurality of computer-generated holograms comprise a first computer-generated hologram arranged to form a first light footprint at a first position in the scene and a second computer-generated hologram arranged to form a second light footprint at a second position in the scene, wherein output of the second computer-generated hologram immediately follows output of the first computer-generated hologram.

LIDAR systems have been disclosed using moving optics, such as rotating prims, to provide light scanning. However, such systems are significantly disadvantaged by their reliance on moving parts. The holographic LIDAR system disclosed herein does not require moving optics in order to provide light scanning. Instead, movement of the light footprint is provided by computational manipulation of the hologram. Again, it is known how in the field of computer-generated hologram how to calculate holographic data representative of a grating in order to provide beam steering and combine it with holographic data representative of an object (e.g. a light footprint). Properties of the holographic grating, such as periodicity, may be dynamically changed in order to steer light to desired positions in the scene.

Figure 5:
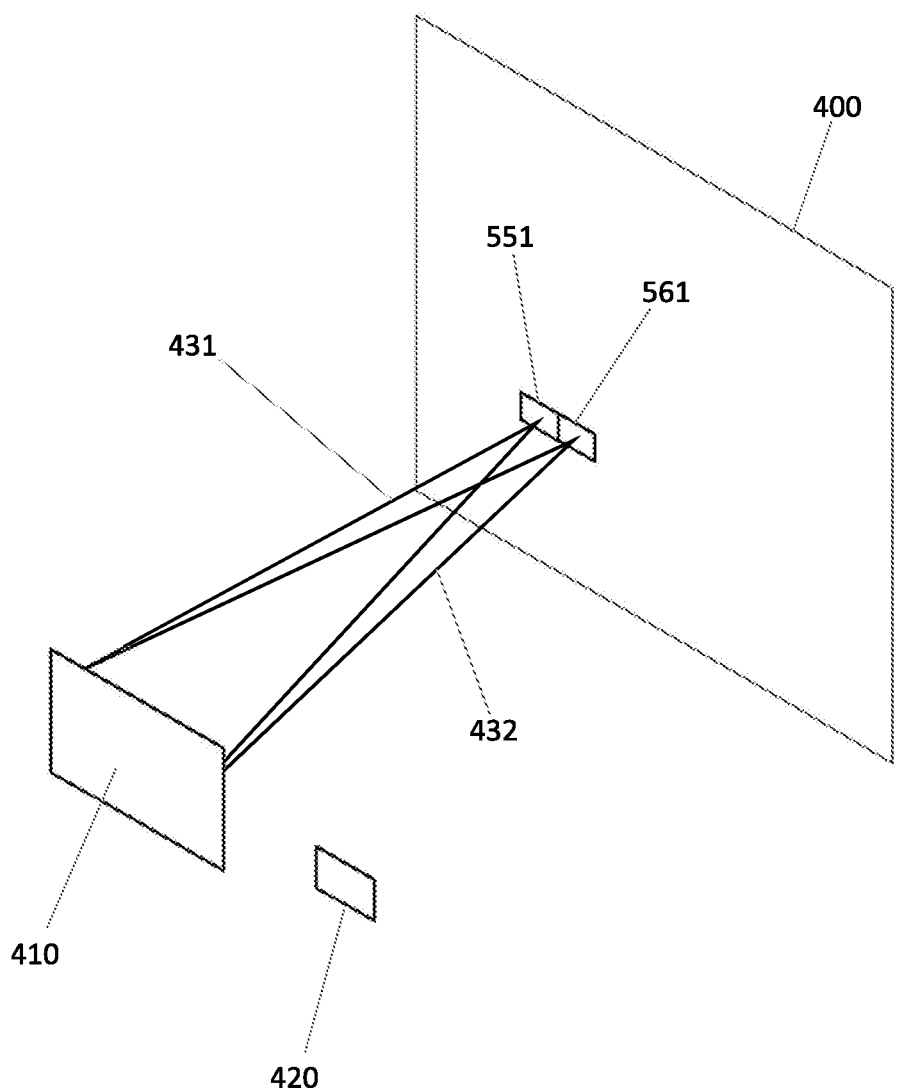
FIG. 5 also shows a LIDAR system in accordance with a first group of embodiments.

LIDAR systems using rotating prisms provide continuous scanning in one direction by continuously rotating the prism at a predetermined speed. In contrast, the holographic LIDAR system disclosed herein allows the light footprint to be dynamically repositioned within the scene without restriction. In particular, the light footprint may be moved from one position in the scene to any other position in the scene without illuminating any intermediate positions. In this respect, it may be said that the light footprint may be instantaneously jumped from one position in the scene to any other position in the scene. In embodiments, the first position is spatially separated from the second position. This provides more flexible scanning in contrast to rotating prism systems which require the prism to rotate into position. Accordingly, the holographic LIDAR system of the present disclosure therefore provides more flexible scanning and faster dynamic scanning. It may be understood, however, that the system is equally suitable for cases in which the first position is substantially adjacent the second position. FIG. 5 shows an embodiment in which the first light footprint 551 and second light footprint 561 are substantially adjacent.

Figure 6:
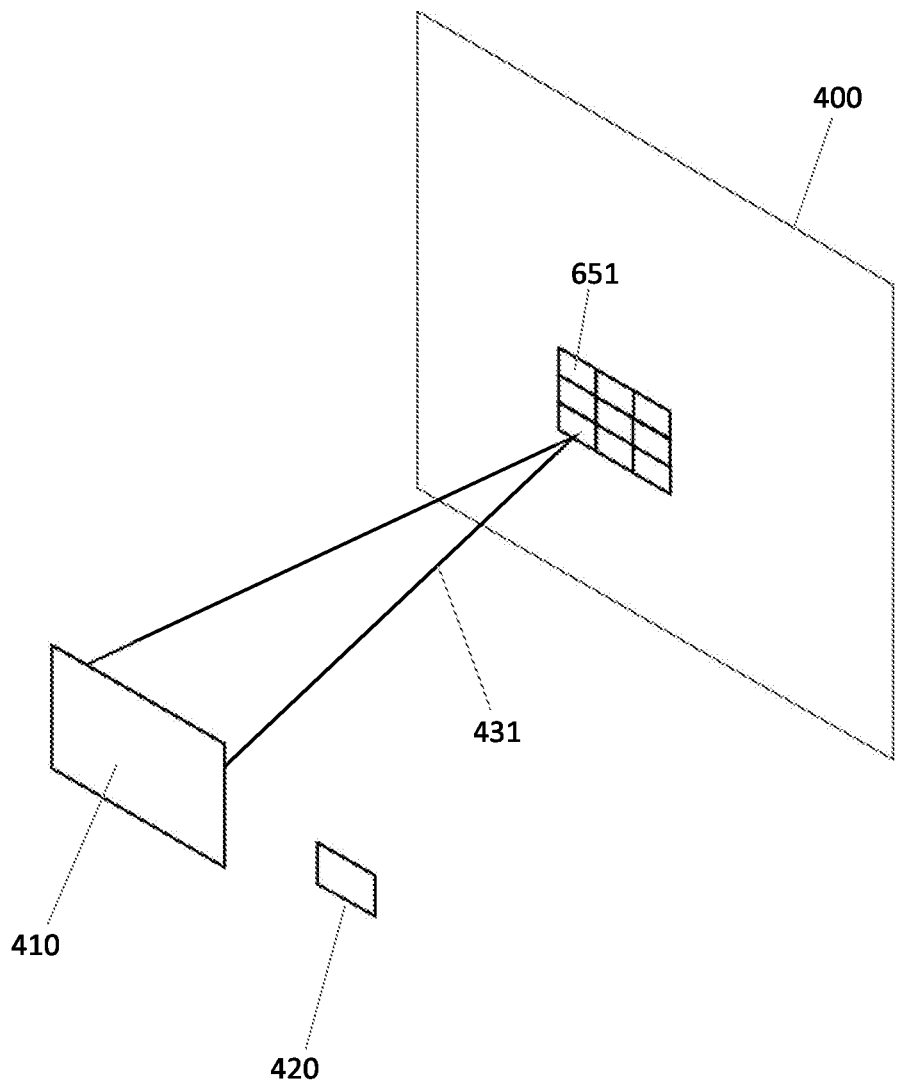
FIG. 6 shows a scanning LIDAR system in accordance with the first group of embodiments.

FIG. 6 shows an embodiment in which the light footprint 651 is moved within the scene to illuminate a continuous area of the scene. That is, in embodiments, the light footprint is continuously repositioned so as to scan the light footprint within the scene. FIG. 6 shows a continuous scan but the present system is equally suitable to providing a discontinuous scan.

The inventor further recognised that the computation nature of the holographic system can be exploited to instantaneously change properties of the light footprint for improved scanning. In embodiments, the first light footprint has a first area and the second light footprint has a second area, wherein the first area is not equal to the second area.

Figure 7A:
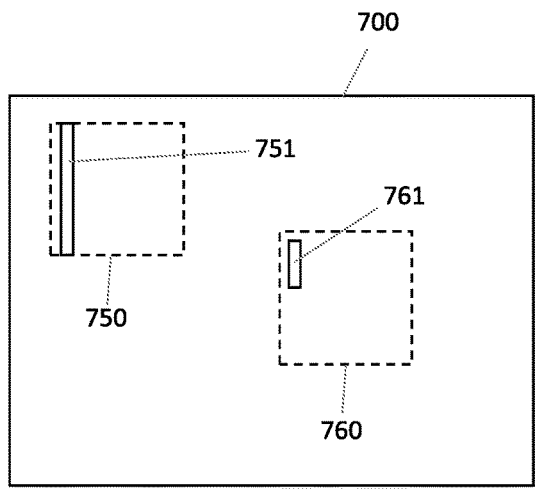
FIGS. 7A, 7B, 7C and 7D show example first light footprints and second light footprints in accordance with the first group of embodiments.

FIG. 7A shows a first light footprint 751 and a second light footprint 761 within a scene 700. The second light footprint 761 has an area less than that of the first light footprint 751. The system may be arranged to scan a first area 750 of the scene 700 with the first light footprint 751 and scan a second area 760 of the scene 700 with the second light footprint 761. The second light footprint 761 may be formed immediately after the first light footprint 751, or vice versa. The smaller the light footprint, the higher the spatial resolution of the system. Therefore, the holographic LIDAR system of the present disclosure enables the spatial resolution of the scanning to be dynamically controlled. For example, in embodiments, it may be advantageous to change the resolution of a scan.

If the light footprint size is decreased, it will become brighter because the method of projection is holographic (every pixel of the hologram contributes to every point in the reconstruction). This improves the signal-to-noise ratio or increases the maximum range of the device. In an embodiment, a higher resolution scan is performed in at least one area of a scene and a lower resolution scan is performed in at least one other area of the scene. In an example, the system is arranged to scan a road with a first light footprint and the curb with a second light footprint, wherein the first light footprint is larger than the second light footprint. Accordingly, the curb is scanned at a higher resolution than, for example, a vehicle ahead. This is because it may be necessary to know if there is a vehicle in front and its distance away but it may not be necessary to determine the width of the vehicle. The higher resolution scan of the curb provides accuracy of position. Therefore, in some embodiments, a relatively low resolution scan of the centre of a scene is performed and at least one relatively high resolution scan of the periphery of the scene is performed. That is, the at least one scan of the periphery of the scene is of higher resolution than a scan of the centre of the scene.

Figure 7B:
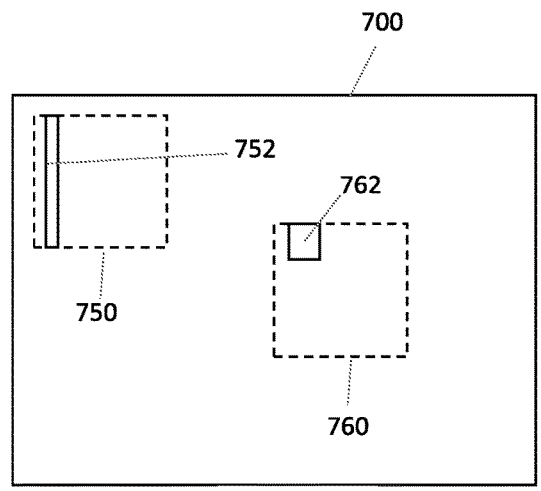

In other embodiments, the holographic system is used to provide footprints of a different shape. FIG. 7B shows an embodiment in which the second light footprint 762 has a different shape to the first light footprint 752. That is, in embodiments, the first light footprint has a first shape and the second light footprint has a second shape, wherein the first shape is different to the second shape. It may be advantageous to use different shaped footprints for probing different areas of the scene or different objects within the scene. Therefore, a more flexible LIDAR system is provided.

Figure 7C:
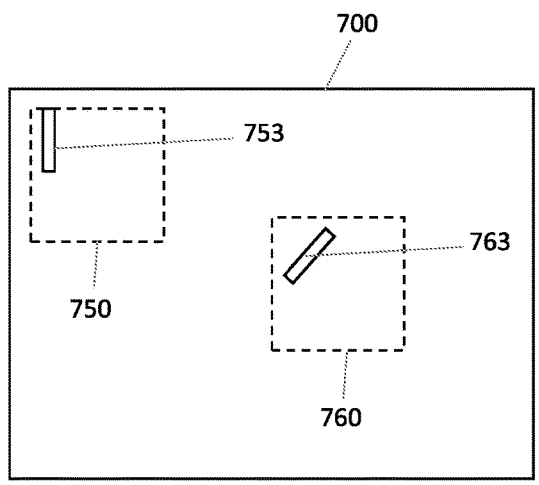

In embodiments, the holographic system is used to rotate the light footprint. FIG. 7C shows an embodiment in which the first light footprint 753 and second light footprint 763 have the same shape but in different orientations. That is, in embodiments, the first light footprint has a shape having a first orientation and the second light footprint has a shape having a second orientation, wherein the first orientation is different to the second orientation. In examples, accurate positional information may be obtained by scanning in two different directions. In other examples, the light response signal may be increased or optimised by changing the orientation of the light footprint.

Figure 7D:
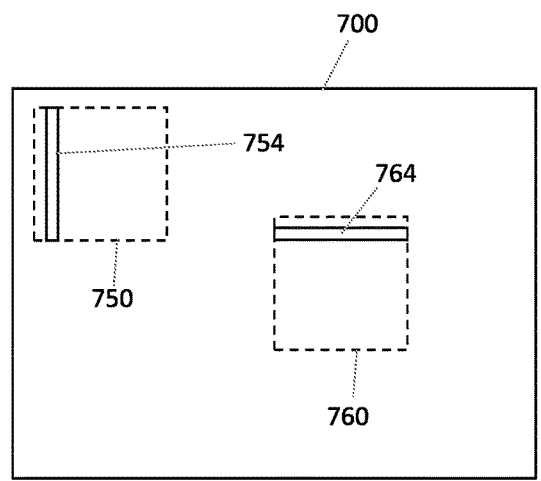

In embodiments, the shape is a substantially one-dimensional shape. For example, the light footprint may have a slit or line shape. FIG. 7D shows an embodiment in which the first light footprint 754 is perpendicular to the second light footprint 764. A one-dimensional footprint provides a one-dimensional scan which is advantageous for quickly sweeping across a scene, for example, to see if any objects are present in the scene. It may be advantageous to perform a one-dimensional scan of a first area of the scene in a first direction and a one-dimensional scan of a second area of the scene in an orthogonal direction. That is, in embodiments, the first orientation is perpendicular to the second orientation.

Second Group of Embodiments—Interleaved Scanning

Figure 8:
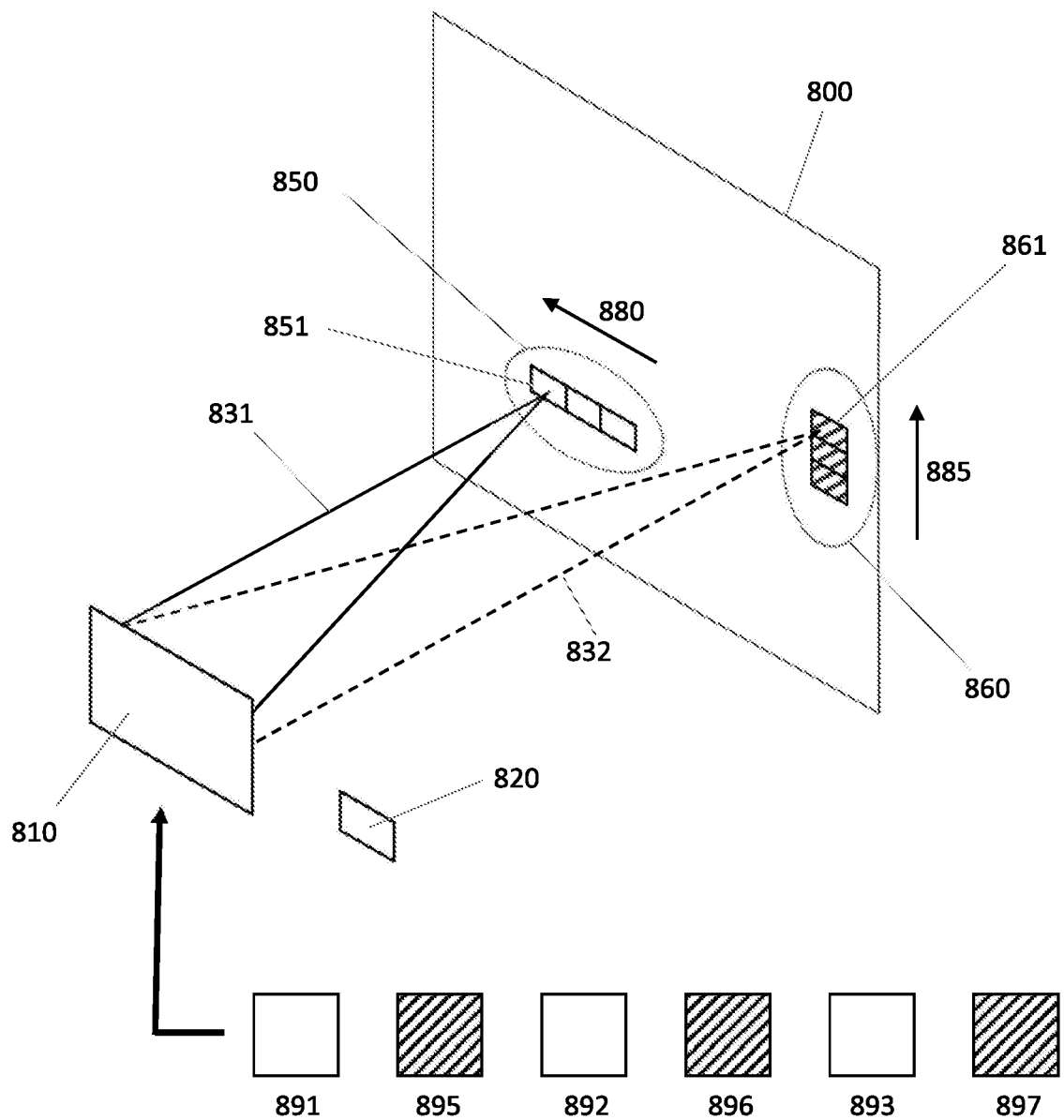
FIG. 8 shows a LIDAR system using interleaved holograms in accordance with a second group of embodiments.

FIG. 8 shows an embodiment comprising a spatial light modulator 810 arranged to direct light to a scene 800 and a light detector 820 arranged to collect reflected light from the scene. Spatial light modulator 810 is arranged to receive light from a light source (not shown) and output spatially modulated light in accordance with a dynamically-variable computer-generated hologram represented on the spatial light modulator 810. FIG. 8 shows the spatial light modulator 810 outputting first spatially modulated light 831 forming a first light footprint 851 in the scene 800 in accordance with a first computer-generated hologram (not shown) represented on the spatial light modulator 810. FIG. 8 also shows the spatial light modulator 810 outputting second spatially modulated light 832 forming a second light footprint 861 in the scene 800 in accordance with a second computer-generated hologram (not shown) represented on the spatial light modulator 810. The first computer-generated hologram and second computer-generated hologram are displayed on the spatial light modulator at different times in order to provide scanning. The spatial light modulator receives a sequence of computer-generated holograms 891, 895, 892, 896, 893, 897, 894 from a holographic controller (not shown) in order to form a corresponding temporal sequence of light footprints within the scene including first light footprint 851 and second light footprint 861.

FIG. 8 further shows a first plurality of computer-generated holograms 891, 892, 893 arranged to form a plurality of first light footprints, including first light footprint 851, within a first area 850 of the scene 800. FIG. 8 also shows a second plurality of computer-generated holograms 895, 896, 897 arranged to form a plurality of second light footprints, including second light footprint 861, within a second area 860 of the scene 800.

The second light footprints, including second light footprint 861, and the second plurality of computer-generated holograms 895, 896 and 897 are hatched for illustrative purposes only to indicate that they correspond. However, it should be remembered that what is displayed on the spatial light modulator is not simply optically translated onto the scene. Each computer-generated hologram is a diffractive pattern which recreates a corresponding light footprint at the scene by interference. There is not a one-to-one correlation between points in the hologram and points in the scene. Each point in the hologram contributes to every point in the corresponding light footprint. Likewise, the first light footprints, including first light footprint 851, and the first plurality of computer-generated holograms 891, 892 and 893 are unhatched for illustrative purposes to indicate that they correspond.

The first plurality of computer-generated holograms 891, 892, 893 are arranged to provide a first scan 850 of the scene 800 in a first direction 880. Computer-generated hologram 893 corresponds to first light footprint 851. The second plurality of computer-generated holograms 895, 896, 897 are arranged to provide a second scan 860 of the scene 800 in a second direction 885. Computer-generated hologram 897 corresponds to second light footprint 861. Although only three computer-generated holograms are shown in FIG. 8 for each scan, the present disclosure encompasses using any number of computer-generated holograms in each scan.

It may therefore be understood that, in embodiments, the plurality of computer-generated holograms comprise a first plurality of computer-generated holograms arranged to provide a first scan within the scene and a second plurality of computer-generated holograms arranged to provide a second scan within the scene. FIG. 8 shows the first scan and the second scan in different directions by way of example only. In other embodiments, the first scan and second scan are scans in the same direction.

FIG. 8 shows holograms of the first plurality of computer-generated holograms and holograms of the second plurality of computer-generated holograms being alternately output to spatial light modulator 810. That is, in embodiments, the first plurality of computer-generated holograms and second plurality of computer-generated holograms are interleaved. However, the present disclosure encompasses any arrangement for the interlacing. For example, FIG. 9 shows an alternative embodiment in which two holograms of the first plurality of computer-generated holograms 991, 992, 993, 994 are interleaved with one hologram of the second plurality of computer-generated holograms 995, 996.

Figure 9:
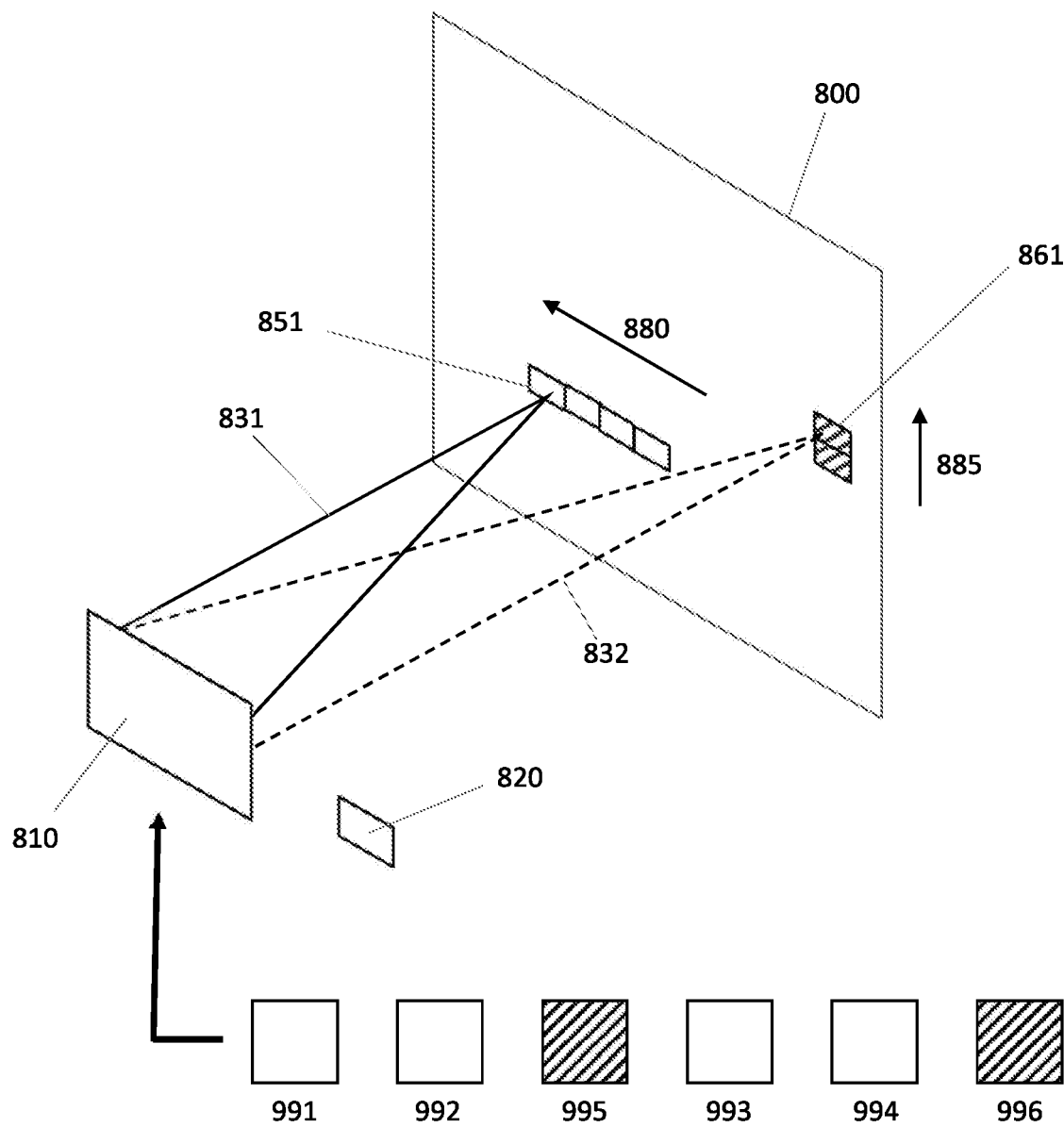
FIG. 9 shows an alternative configuration for interleaving holograms in accordance with the second group of embodiments.

In embodiments, including the embodiments shown in FIGS. 8 and 9, the first scan is a scan of a first area of the scene and the second scan is a scan of a second area of the scene, wherein the second area is spatially separated from the first area. It may be understood that the plurality of computer-generated holograms are arranged to scan the first area and second area by moving spatially-modulated light back and forth between the first area and second area. Again, as described above, LIDAR systems based on scanning optics cannot achieve this functionality which allows for more rapid scanning of spatially separated areas of the scene.

Figure 10:
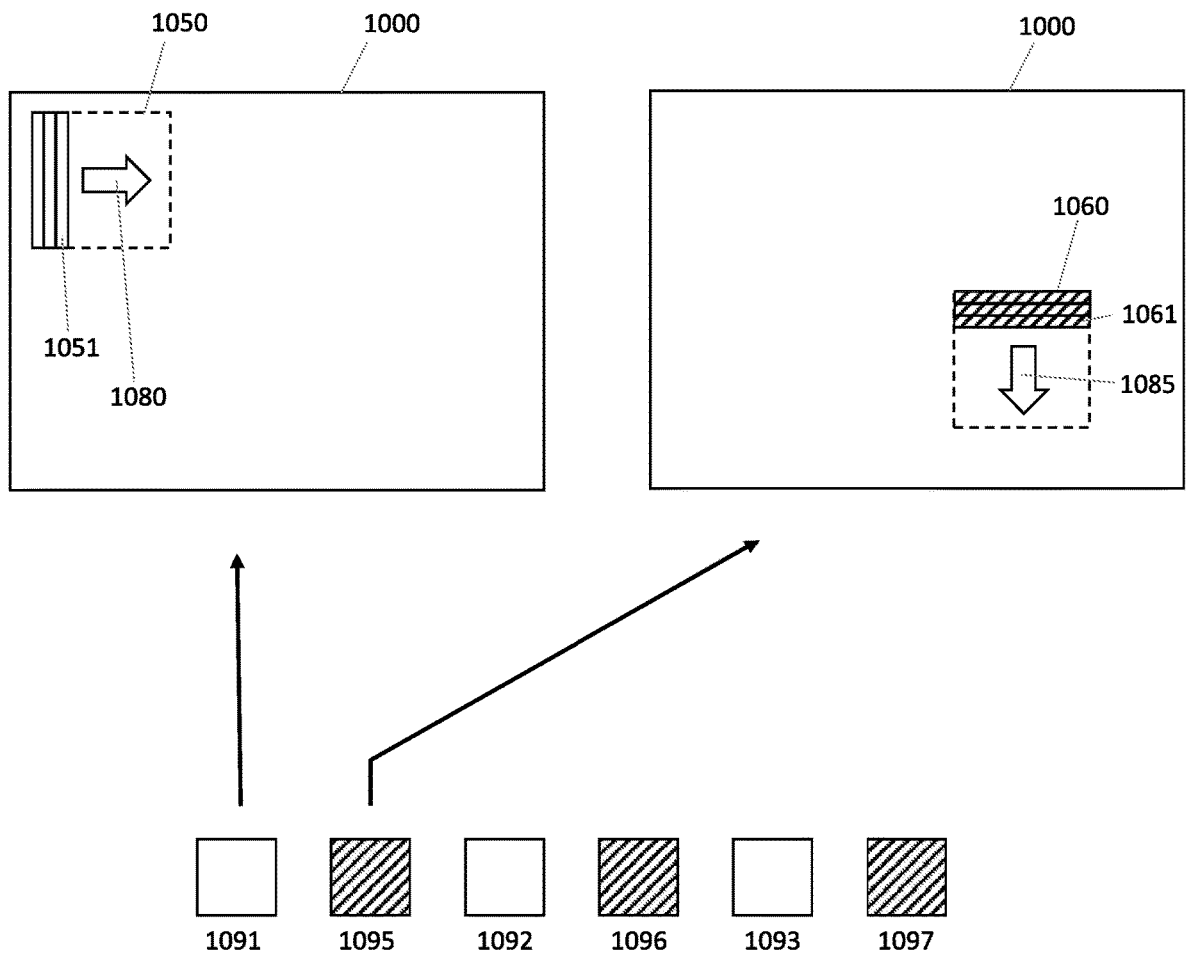
FIG. 10 shows interleaved holograms for scanning different areas of the scene in different directions in accordance with the second group of embodiments.

FIG. 10 shows a scene 1000 comprises a first area 1050 and a second area 1060. A first plurality of computer-generated holograms 1091, 1092, 1093 are arranged to scan a first light footprint 1051 in a first direction 1080 within a first area 1050. A second plurality of computer-generated holograms 1095, 1096, 1097 are arranged to scan a second light footprint 1061 in a second direction 1085 within a second area 1060. Accordingly, in embodiments, the first scan is a scan in a first direction of the first area of the scene and the second scan is a scan in a second direction of the second area of the scene. In embodiments, the second scan may also be a scan of the first area. In embodiments, the second scan is performed in the same direction as the first scan.

Figure 11:
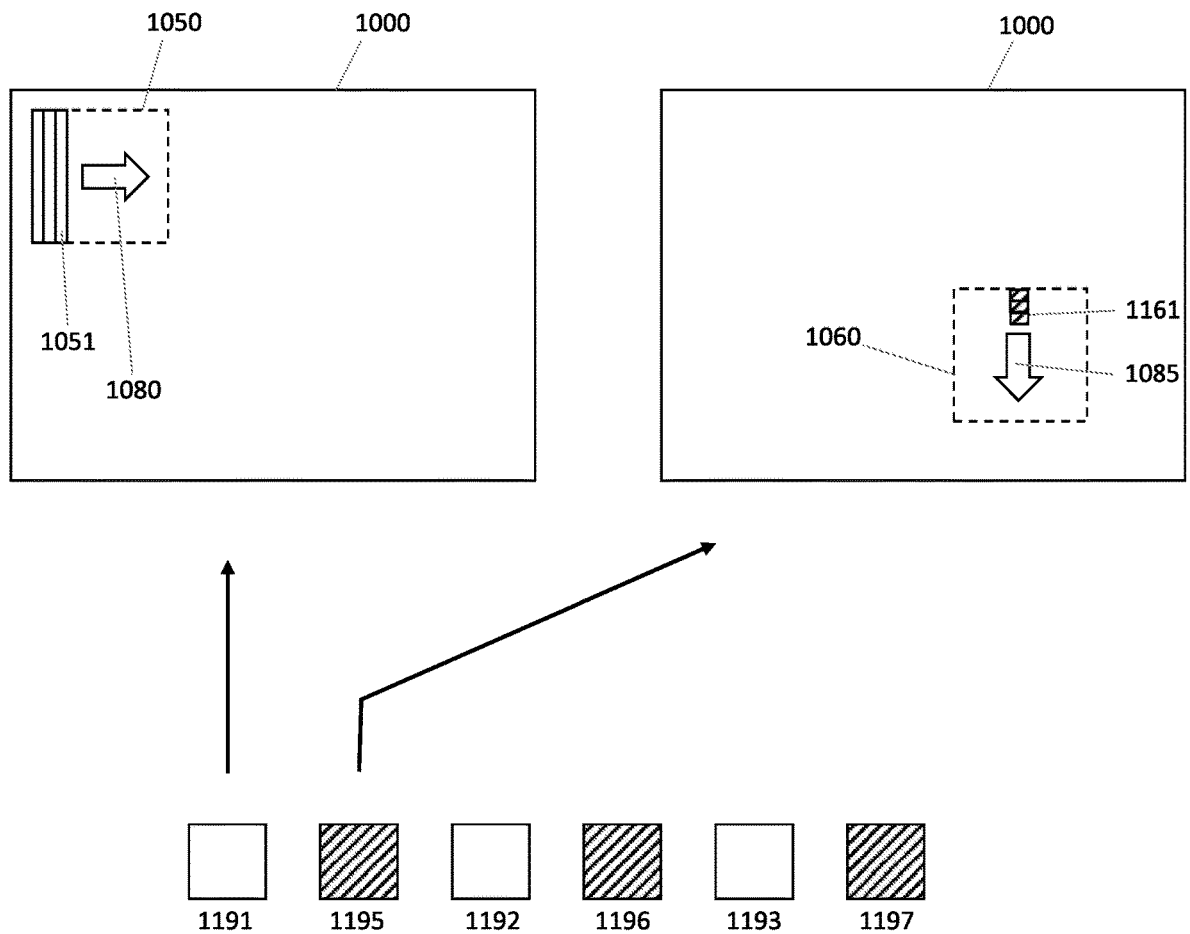
FIG. 11 shows interleaved holograms forming a first light footprint of a first size and a second light footprint of a second size smaller than the first size in accordance with the second group of embodiments.

In accordance with embodiments, a first scan at a relatively low resolution is interleaved with a second scan at a higher resolution scan. Again, the smaller the light footprint, the higher the spatial resolution. FIG. 11 shows an embodiment in the which the second footprint 1161 has a smaller area than the first footprint 1051. It may therefore be understood that, in embodiments, the first plurality of computer-generated holograms are arranged to form a first light footprint having a first area and the second plurality of computer-generated holograms are arranged to form a second light footprint having a second area, wherein the first area is not equal to the second area.

In embodiments, the first light footprint has a substantially one-dimensional shape extending in a second direction and the second light footprint has a substantially one-dimensional shape extending in a first direction.

The first and second interleaved scans may relate to the same or different areas of the scene. Scanning the same area of the scene concurrently using different light footprints (e.g. a footprint of the first scan corresponding to a fine or high resolution scan and a footprint of the second scan corresponding to coarse or low resolution scan) may provide different information about the area of the scene. Scanning different areas of the scene concurrently using the same or different footprints can obtain information about the different areas of the scene. Since the first and second scans are interleaved, and therefore performed concurrently, the information captured by both scans relates to the scene at substantially the same point in time.

In accordance with embodiments, the first scan may comprise a stochastic scan, which projects a light footprint that is moved randomly around the scene (e.g. to different areas around a vehicle). When a feature within the scene is identified from the stochastic scan (e.g., from a light response signal in response to the first scan) or otherwise, a second scan of an area including the identified feature may be performed (e.g. at higher resolution). In embodiments, the stochastic scan is continuous, and one or more second (e.g. higher resolution) scans are interleaved with the stochastic scan. In particular, high resolution second scans may be performed concurrently with the stochastic scan, as described above with reference to FIGS. 8 to 11. Thus, the stochastic scan may be performed continuously, and second scans of limited duration may be introduced, interleaved into the stochastic scan, as necessary. For example, a second, high resolution scan of a particular area may be added, interleaved with the stochastic scan, when a feature is detected within the area, and then removed when the high resolution scan is complete. Thus, new targets are continually identified by the continuous stochastic scan, and further detail of such identified targets are subsequently obtained by the second scans. In alternative embodiments, the second scan may be performed instead of the stochastic scan (i.e., the first and second scans are not concurrent). In this case, scanning alternates between the first and second scans.

Third Group of Embodiments—Intelligent Scanning

Embodiments provide a feedback system in which the results of a first scan are used to determine the computer-generated holograms for a second scan. The step of determining the computer-generated holograms for the second scan may comprise selecting the holograms from a repository of holograms or calculating the holograms.

Figure 12:
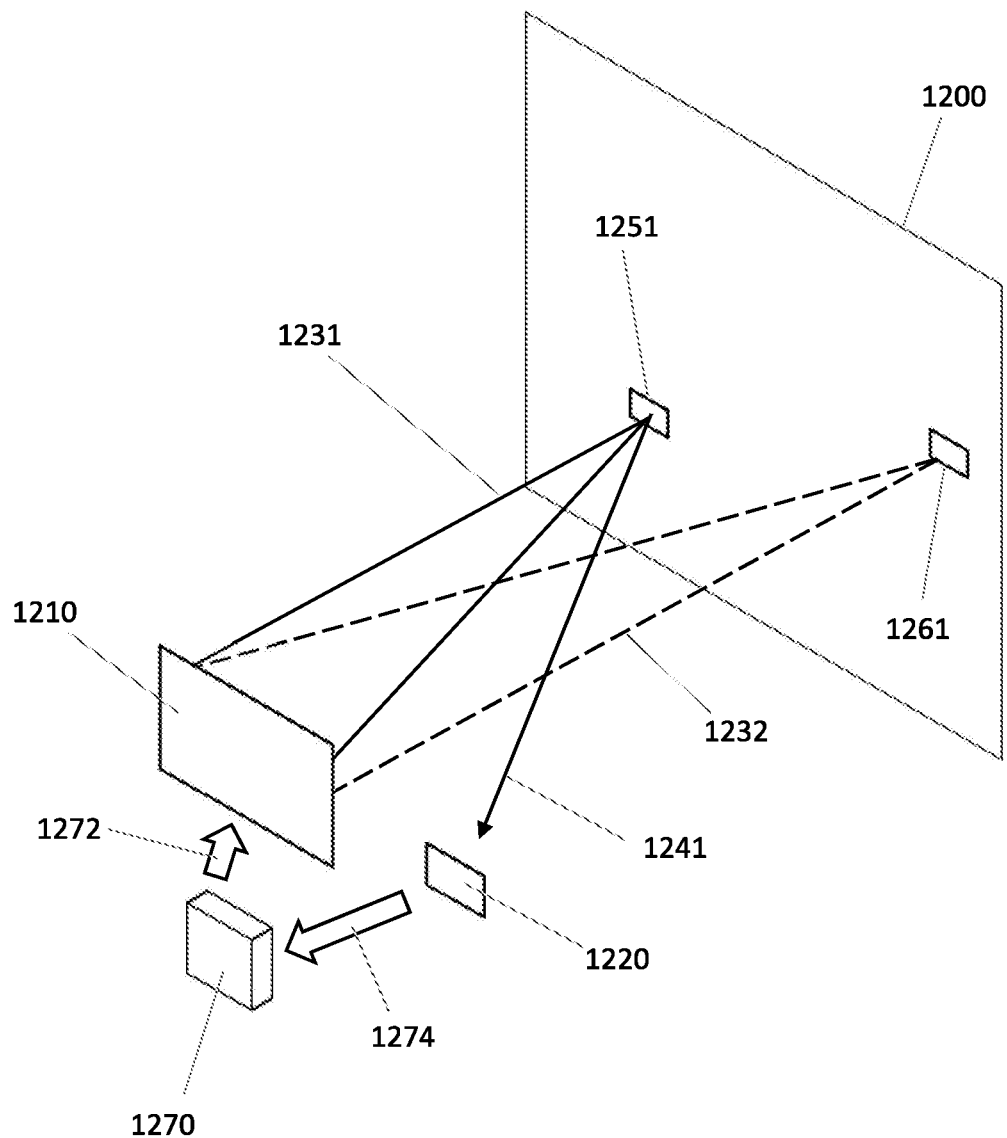
FIG. 12 shows a feedback system for determining a plurality of computer-generated holograms based on a received signal from the light detector in accordance with a third group of embodiments.

FIG. 12 shows an embodiment comprising a spatial light modulator 1210 arranged to direct light to a scene 1200 and a light detector 1220 arranged to collect reflected light from the scene. Spatial light modulator 1210 is arranged to receive light from a light source (not shown) and output spatially modulated light in accordance with a dynamically-variable computer-generated hologram represented on the spatial light modulator 1210. FIG. 12 shows the spatial light modulator 1210 outputting first spatially modulated light 1231 forming a first light footprint 1251 in the scene 1200 in accordance with a first computer-generated hologram (not shown) represented on the spatial light modulator 1210.

FIG. 12 further shows light detector 1220 receiving reflected light 1241 from the region of the scene 1200 illuminated by the first light footprint 1251. For example, the light may be reflected off an object in the scene. In response to receiving the reflected light 1241, light detector 1220 outputs a light response signal 1274. A holographic controller 1270 is arranged to receive the light response signal 1274 and determine a second plurality of computer-generated holograms. Holographic controller 1270 outputs holographic data 1272, comprising the second plurality of computer-generated holograms, to the spatial light modulator 1210.

The holographic controller 1270 may assess a property of the light response signal 1274 in order to determine the second plurality of computer-generated holograms. In embodiments, the holographic controller 1270 determines if the light response signal 1274 indicates that an object is present in the area scanned with the first light footprint. In some embodiments, the property of the light response signal 1274 is the maximum (or peak) intensity or average (or mean) intensity of the light response signal 1274. In other embodiments, the property of the light response signal 1274 is change in the intensity of the light response signal 1274 or a rate of change of intensity in the light response signal 1274. The property of the light response signal may be any property of the light response signal 1274, or any feature in the light response signal 1274, which may provide information about the area scanned or any objects in the area scanned. For example, the holographic controller 1270 may determine if the magnitude of the light response signal 1274 exceeds a threshold value. For example, in embodiments, the holographic controller 1270 determines that an object is present in a first area scanned with the first light footprint 1251 and determines a second plurality of computer-generated holograms arranged to scan the first area again at high resolution. For example, in other embodiments, the holographic controller 1270 determines that an object is not present in a first area scanned with the first light footprint 1251 and determines a second plurality of computer-generated holograms arranged to scan a second area of the scene with second light footprint 1261. For example, in other embodiments, the holographic controller 1270 determines that the light response signal is inconclusive (for example, relatively noisy) and determines a second plurality of computer-generated holograms arranged to scan the same area of the scene again but in a different direction.

In response to each computer-generated hologram of the second plurality of computer-generated holograms, a corresponding second light footprint 1261 is formed in the scene 1200. The second light footprint 1261 may be scanned within the scene 1200 as previously described. The spatial light modulator 1210 receives the second plurality of computer-generated holograms from the holographic controller 1270 in order to form a corresponding temporal sequence of light footprints, including second light footprint 1261, within the scene 1200.

Therefore, in embodiments, the plurality of computer-generated holograms comprise a first plurality of computer-generated holograms arranged to provide a first scan within the scene, and the holographic controller is arranged to receive the light response signal in response to the first scan and determine a second plurality of computer-generated holograms based on a property of the light response signal in response to the first scan. In embodiments, the second plurality of computer-generated holograms are arranged to provide a second scan within the scene.

Figure 13A:
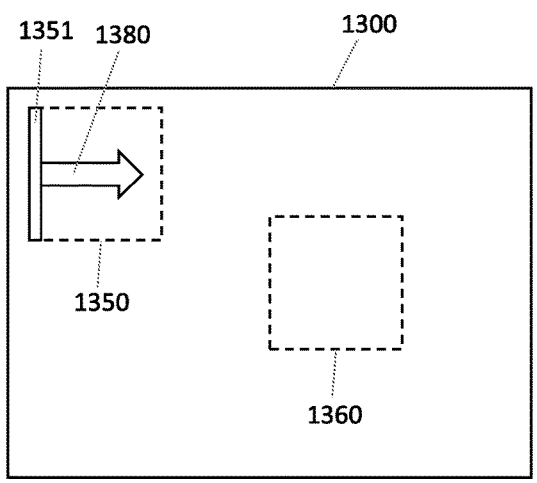
FIGS. 13A, 13B, 13C and 13D show example first and second scans in accordance with the third group of embodiments.

FIG. 13A shows an embodiment in which the first scan is a scan of a first area 1350 of the scene 1300 with a first light footprint 1351 in a first direction 1380. The second scan, corresponding to the second plurality of computer-generated holograms, may be a scan of the first area 1350 or a second area 1360 of the scene 1300.

Figure 13B:
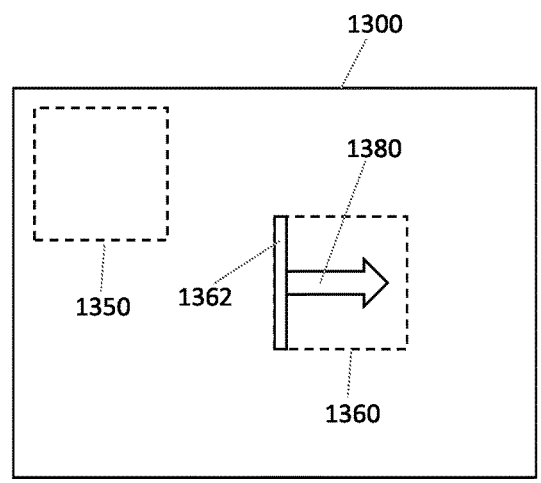

FIG. 13B shows an embodiment in which the first scan is a scan of a first area of the scene and the second scan is a scan of a second area of the scene, wherein the second area is spatially separated from the first area.

Figure 13C:
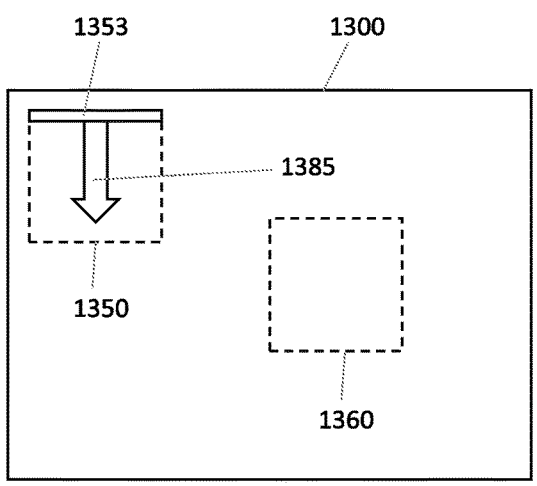

FIG. 13C shows an embodiment in which the first scan is a scan in a first direction of the first area of the scene and the second scan is a scan in a second direction of the first area of the scene. In embodiments, the second scan is performed using a second light footprint having a different size, shape and/or orientation to the first light footprint.

Figure 13D:
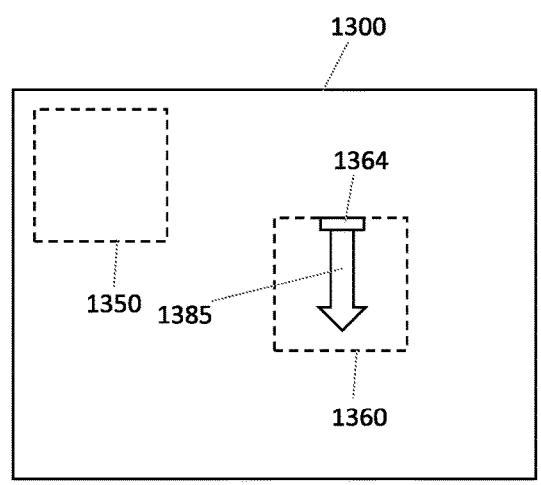

FIG. 13D shows an embodiment in which the first plurality of computer-generated holograms are arranged to form a first light footprint having a first area and the second plurality of computer-generated holograms are arranged to form a second light footprint having a second area, wherein the first area is not equal to the second area.

In embodiments, the first area of the scene, which is scanned by the first scan, may be the same, part of, adjacent or spatially separated from the second area of the scene, which is scanned by the second scan.

Variations for All Groups of Embodiments

In embodiments, the first light footprint has a substantially one-dimensional shape extending in a second direction and the second light footprint has a substantially one-dimensional shape extending in a first direction.

In embodiments, the spatially light modulator is a phase-only spatial light modulator. These embodiments are advantageous because no optical energy is lost by modulating amplitude. Accordingly, an efficient holographic projection system is provided. However, the present disclosure may be equally implemented on an amplitude-only spatial light modulator or an amplitude and phase modulator. It may be understood that the hologram will be correspondingly phase-only, amplitude-only or fully-complex.

Figure 14:
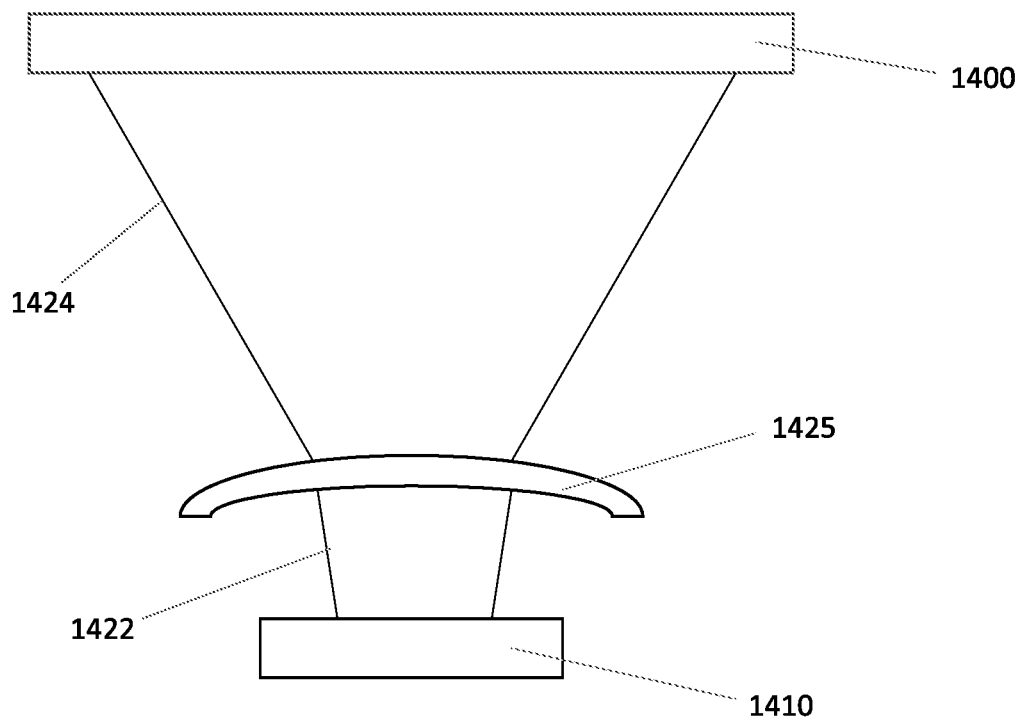
FIG. 14 shows an example of an angular magnification system.

Embodiments include an angular magnification system to increase the field of view of the system. FIG. 14 shows an angular magnification system 1425 arranged to receive spatially modulated light from a spatial light modulator 1410 at a first angle. The angular magnification system 1425 outputs spatially modulated light, at a second angle greater than the first angle, which illuminates the scene. FIG. 14 shows that the angular magnification system 1425 is arranged to receive light 1422 at a first angle and output light 1424 at a second angle greater than the first angle. It may be said that the angular magnification system magnifies the angle of light of the spatially modulated light. That is, in embodiments, the LIDAR system further comprises an angular magnification system arranged to magnify the angular deflection of the spatially-modulated light from the spatial light modulator.

In embodiments, the angular magnification is provided by refraction. That is, in embodiments, the angular magnification system is arranged to refract the spatially-modulated light. In embodiments, the angular magnification system is arranged to receive the spatially modulated light at a first angle and output the spatially modulated light at a second angle, wherein the second angle is greater than the first angle.

In embodiments, the light is pulsed. Accordingly, in embodiments, the system is configured so as any reflected signal is received by the detector before the next light footprint irradiates the scene. Accordingly, the system can process any return signal before the next light footprint and no confusion between which footprint gave rise to a return signal can occur. The skilled person will understand how to synchronise the light source, holographic controller, spatial light modulator, light detector and any necessary processor in order to provide this functionality and so a detailed description is not provided here.

Each light footprint is formed using a corresponding computer-generated hologram. Each computer-generated hologram is displayed on the spatial light modulator in accordance with holographic data provided to the spatial light modulator. Each computer-generated hologram may be comprised of different data components. The data provides instructions for the spatial light modulator which individually address each light modulating pixel of the spatial light modulator. Specifically, the data may provide instruction for each pixel on how much to modulate light. In embodiments, the computer-generated hologram comprises first holographic data defining the size and shape of the light footprint and second holographic data defining the position of the light footprint in the scene. The first holographic data may include holographic data which provides an optical effect. In embodiments, the first holographic data comprises a lensing function. As described above, the second holographic data provides variable beam steering information. In embodiments, the second holographic data comprises a grating function.

Figure 15:
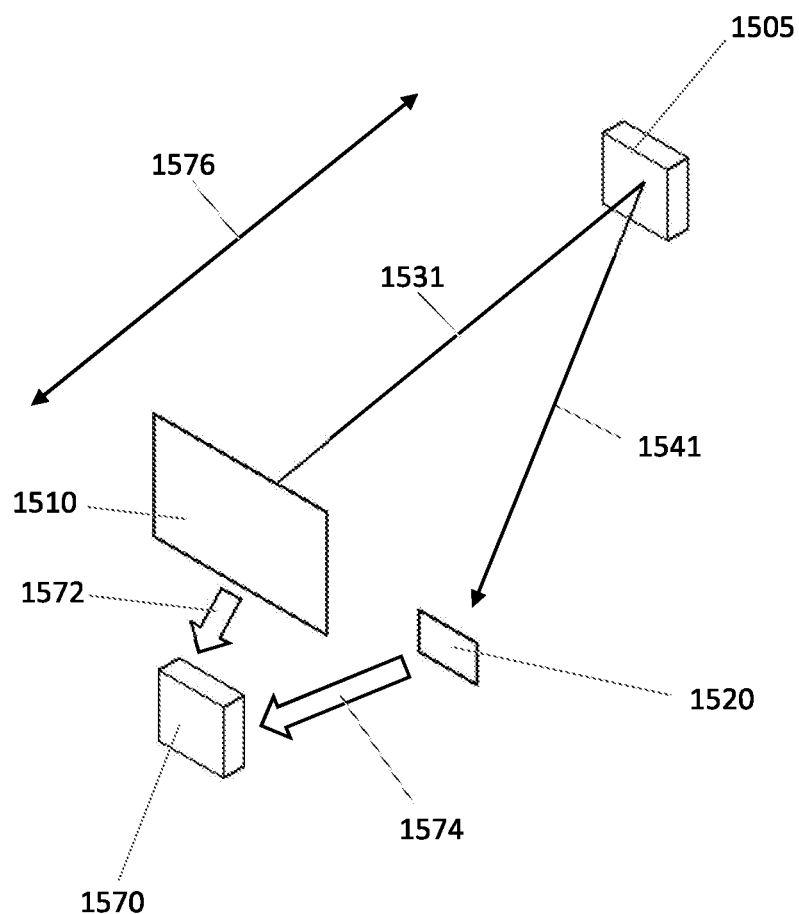
FIG. 15 illustrates a method for detecting and ranging of an object in accordance with embodiments.

FIG. 15 shows an embodiment comprising a processor 1570 in communication with the spatial light modulator 1510 and light detector 1520. In operation, processor 1570 is arranged to receive a light response signal from the light detector 1520 and a synchronisation information 1572 from the spatial light modulator 1510. Spatial light modulator 1510 is arranged to output spatially modulated light 1531 forming a light footprint (not shown) at a position in the scene. An object 1505 at the position in the scene reflects spatially modulated light 1531 and the reflected light 1541 is detected by light detector 1520. Light detector 1520 is configured to have a field of view including the scene.

For example, light detector 1520 may comprise a single light detecting element (e.g. single photodiode) or an array of light detecting elements (e.g. one-dimensional or two-dimensional array of photodiodes), depending upon the light footprint and/or design requirements. Light pulsing and synchronisation between the components of the system, as previously described, is used to determine a time of flight for the spatially modulated light as it travels from the spatial light modulator 1510 to the light detector 1520 via the object 1505. This time of flight measurement can be used to determine the straight-line distance 1576 from the spatial light modulator 1510 to the object 1505. Accordingly, a light detection and ranging (LIDAR) system is provided. In embodiments, at least one of a LIDAR emitter comprising the spatial light modulator 1510 and a LIDAR receiver comprising the light detector 1520, may be located within a lamp unit or a portable device or vehicle, such as the headlamp unit of a vehicle. The processor 1570 may be located with the LIDAR emitter and/or the LIDAR detector or may be located remotely.

In embodiments, the light source is a laser. In embodiments, the light detector is a photodetector. In embodiments, there is provided a vehicle comprising the LIDAR system.

In embodiments, the laser light from the light source may be modulated with a code that is unique to the LIDAR system. Such coding may be used in order to avoid interference or confusion with light associated with other LIDAR systems (e.g. within other vehicles on the road). In such embodiments, the LIDAR receiver looks for the coding in received light, and only processes received light modulated with the corresponding code. For example, binary modulation of the light amplitude with a unique binary number pattern may be performed to provide the unique code (e.g. by switching the light source on and off in a predetermined code or pattern). Other types of modulation or encoding of the laser light could be employed.

In some embodiments, two or more light sources may be used. For example, two or more lasers having different wavelengths (e.g. within the IR range) may be included in the LIDAR system, and used at different times to provide light to the SLM. The laser used as the light source, and thus the wavelength of light used for form the light footprint, may be changed according to ambient conditions, such as when fog or other adverse weather conditions are detected, to provide improved light penetration.

In embodiments, the LIDAR system may perform scanning at different distance ranges. For example, in embodiments, the holographic controller of the LIDAR system may provide different temporal sequences of holograms to the SLM for scanning the scene for respective distance ranges. In particular, the holographic data provided to the SLM may be determined so that the light footprint is focused at a replay plane corresponding to the required distance or range (e.g. by adjusting the lensing function corresponding to a Fourier Transform lens used to reconstruct the computer-generated hologram or by changing the corresponding lensing data within the data, as described above). In other embodiments, a physical Fourier Transform lens may be selected to focus the light footprint at a replay plane corresponding the required distance or range. Thus, in embodiments, it may be said that the light footprint, or a parameter or element associated with the plurality of computer-generated holograms that form the light footprint, is determined based on a distance range. In particular, the determination is such that the light footprint is focused at a distance corresponding to the distance range.

The appropriate lensing function/data or physical Fourier Transform lens for a particular range may be determined in response to a range selection signal. For example, a range selection signal may be provided manually by a user, or automatically when a predetermined condition is detected. The selection of the range may be based on vehicle speed, density of traffic or other driving factors or conditions. Selection of a longer range scan may be preferred when the vehicle is travelling at higher speed. For example, a long range may be preferred for motorway driving and a short range may be preferred for city driving in dense traffic. Thus, in embodiments, the distance range is selected based on a received signal. In embodiments the distance range is determined based on at least one of: vehicle speed; ambient conditions; weather conditions; traffic conditions and other driving parameters.

Although first, second and third groups of embodiments have been largely disclosed separately, any feature of any embodiment or group of embodiments may be combined with any other feature or combination of features of any embodiment or group of embodiments. That is, all possible combinations and permutations of features disclosed in the present disclosure are envisaged.

In embodiments, the first light footprint may be formed of light of a first wavelength and the second light footprint may formed of light of a second wavelength. In embodiments, the first scan may be performed using light of a first wavelength and the second scan may be performed using light of a second wavelength. In embodiments, the first and second wavelengths are different colours of visible light. In embodiments, one or both of the first and second wavelengths are different wavelengths of infrared.

In embodiments, the system comprises a first spatial light modulator to form the first light footprint and a second spatial light modulator to form the second light footprint. In other embodiments, a single spatial light modulator is used. For example, in embodiments, a first area of a spatial light modulator is allocated to the hologram forming the first light footprint and a second area of the spatial light modulator is allocated to the hologram forming the second light footprint.

The quality of the holographic reconstruction may be affect by the so-called zero order problem which is a consequence of the diffractive nature of using a pixelated spatial light modulator. Such zero-order light can be regarded as "noise" and includes for example specularly reflected light (i.e. undiffracted light), and other unwanted light from the SLM.

In the example of Fourier holography, this "noise" is focused at the focal point of the Fourier lens leading to a bright spot at the centre of the holographic reconstruction, known as the "DC spot". The zero order light may be simply blocked out however this would mean replacing the bright spot with a dark spot. Embodiments include an angularly selective filter to remove only the collimated rays of the zero order. Embodiments also include the method of managing the zero-order described in European patent 2,030,072 which is hereby incorporated in its entirety by reference. In other embodiments, the spatial light modulator is illuminated with diverging light such that the diffracted light formed the light footprint is brought to a focus at the replay plane but the zero-order light (which is not diffracted) continues diverging. The zero order light is therefore effectively dispersed.

Whilst embodiments described herein include displaying one hologram per frame on the spatial light modulator, the present disclosure is by no means limited in this respect and more than one hologram may be displayed on the SLM at any one time. For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the holographic reconstruction produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single cycle of a sine wave, with zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality. Preferably, each tile is a whole tile, although embodiments use fractions of a tile.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The following items are disclosed:

Item 1. A light detection and ranging, "LIDAR", system arranged to scan a scene, the system comprising:
 a light source arranged to output light having a first characteristic;
 a spatial light modulator, "SLM", arranged to receive the light from the light source and output spatially-modulated light in accordance with computer-generated holograms represented on the spatial light modulator;
 a holographic controller arranged to output a plurality of computer-generated holograms to the spatial light modulator, wherein each computer-generated hologram is arranged to form a corresponding light footprint within the scene and the holographic controller is further arranged to change the position of the light footprint within the scene; and
 a light detector arranged to receive light having the first characteristic from the scene and output a light response signal.

Item 2. A LIDAR system as defined in item 1, wherein the plurality of computer-generated holograms comprise a first plurality of computer-generated holograms arranged to provide a first scan within the scene, and wherein the holographic controller is arranged to receive the light response signal in response to the first scan and determine a second plurality of computer-generated holograms based on a property of the light response signal in response to the first scan.

Item 3. A LIDAR system as defined in item 2 wherein the second plurality of computer-generated holograms are arranged to provide a second scan within the scene.

Item 4. A LIDAR system as defined in item 3 wherein the first scan is a scan of a first area of the scene and the second scan is a scan of a second area of the scene.

Item 5. A LIDAR system as defined in item 3 or 4 wherein the first scan is a scan in a first direction of the first area of the scene and the second scan is a scan in a second direction of the first area of the scene.

Item 6. A LIDAR system as defined in any of items 2 to 5 wherein the first plurality of computer-generated holograms are arranged to form a first light footprint having a first area and the second plurality of computer-generated holograms are arranged to form a second light footprint having a second area, wherein the first area is not equal to the second area.

Item 7. A LIDAR system as defined in item 6 wherein the first light footprint has a substantially one-dimensional shape extending in a second direction and the second light footprint has a substantially one-dimensional shape extending in a first direction.

Item 8. A LIDAR system as defined in item 1 wherein the plurality of computer-generated holograms comprise a first computer-generated hologram arranged to form a first light footprint at a first position in the scene and a second computer-generated hologram arranged to form a second light footprint at a second position in the scene, wherein output of the second computer-generated hologram immediately follows output of the first computer-generated hologram.

Item 9. A LIDAR system as defined in item 8 wherein the first position is spatially separated from the second position.

Item 10. A LIDAR system as defined in item 9 wherein the first position is substantially adjacent the second position.

Item 11. A LIDAR system as defined in any of items 8 to 10 wherein the light footprint is continuously repositioned so as to scan the light footprint within the scene.

Item 12. A LIDAR system as defined in any of items 8 to 11 wherein the first light footprint has a first area and the second light footprint has a second area, wherein the first area is not equal to the second area.

Item 13. A LIDAR system as defined in any of items 8 to 12 wherein the first light footprint has a first shape and the second light footprint has a second shape, wherein the first shape is different to the second shape.

Item 14. A LIDAR system as defined in any of items 8 to 13 wherein the first light footprint has a shape having a first orientation and the second light footprint has a shape having a second orientation, wherein the first orientation is different to the second orientation.

Item 15. A LIDAR system as defined in item 14 wherein the shape is a substantially one-dimensional shape.

Item 16. A LIDAR system as defined in items 14 or 15 wherein the first orientation is perpendicular to the second orientation.

Item 17. A LIDAR system as defined in item 1 wherein the plurality of computer-generated holograms comprise a first plurality of computer-generated holograms arranged to provide a first scan within the scene and a second plurality of computer-generated holograms arranged to provide a second scan within the scene.

Item 18. A LIDAR system as defined in item 17 wherein the first plurality of computer-generated holograms and second plurality of computer-generated holograms are interleaved.

Item 19. A LIDAR system as defined in item 17 or 18 wherein the first scan is a scan of a first area of the scene and the second scan is a scan of a second area of the scene.

Item 20. A LIDAR system as defined in item 19 wherein the second area is spatially separated from the first area.

Item 21. A LIDAR system as defined in item 19 or 20 wherein the plurality of computer-generated holograms are arranged to scan the first area and second area by moving spatially-modulated light back and forth between the first area and second area.

Item 22. A LIDAR system as defined in any of items 17 to 21 wherein the first plurality of computer-generated holograms arranged to perform the first scan are arranged to form a light footprint at a plurality of random positions within the scene.

Item 23. A LIDAR system as defined in item 22 wherein the first scan is continuous.

Item 24. A LIDAR system as defined in item 22 or 23 wherein the second plurality of computer-generated holograms are arranged to perform the second scan of an area within the scene.

Item 25. A LIDAR system as defined in item 24 wherein the area is determined based on a property of the light response signal in response to the first scan.

Item 26. A LIDAR system as defined in any of items 17 to 25 wherein the first scan is a scan in a first direction and the second scan is a scan in a second direction.

Item 27. A LIDAR system as defined in any of items 17 to 26 wherein the first plurality of computer-generated holograms are arranged to form a first light footprint having a first area and the second plurality of computer-generated holograms are arranged to form a second light footprint having a second area, wherein the first area is not equal to the second area.

Item 28. A LIDAR system as defined in item 27 wherein the first light footprint has a substantially one-dimensional shape extending in a second direction and the second light footprint has a substantially one-dimensional shape extending in a first direction.

Item 29. A LIDAR system as defined in any preceding item wherein each computer-generated hologram is a phase-only hologram.

Item 30. A LIDAR system as defined in any preceding item wherein the spatially modulated light output by the SLM is encoded with a code that is unique to the LIDAR system.

Item 31. A LIDAR system as defined in item 30 wherein the spatially modulated light output by the SLM is encoded by modulation of the light amplitude.

Item 32. A LIDAR system as defined in any preceding item comprising first and second light sources configured to output light of different wavelengths to the SLM.

Item 33. A LIDAR system as defined in item 32 wherein one of the first and second light sources is selected based on ambient conditions.

Item 34. A LIDAR system as defined in any preceding item wherein the light footprint, or a parameter or element associated with the plurality of computer-generated holograms that form the light footprint, is determined based on a received signal.

Item 35. A LIDAR system as defined in item 34 wherein the received signal provides an indication of at least one of: vehicle speed; ambient conditions; weather conditions; traffic conditions and other driving parameters.

Item 36. A LIDAR system as defined in any preceding item wherein the light footprint, or the parameter or element associated with the plurality of computer-generated holograms that form the light footprint, is determined based on a distance range.

Item 37. A LIDAR system as defined in item 36 wherein the light footprint, or the parameter associated with the plurality of computer-generated holograms that form the light footprint, is determined so as to focus the light footprint at a distance corresponding to a distance range.

Item 38. A LIDAR system as defined in item 36 or 37 wherein the distance range is selected based on at least one of: vehicle speed; ambient conditions; weather conditions; traffic conditions and other driving parameters.

Item 39. A LIDAR system as defined in any preceding item further comprising an angular magnification system arranged to magnify the angular deflection of the spatially-modulated light from the spatial light modulator.

Item 40. A LIDAR system as defined in item 39 wherein the angular magnification system is arranged to refract the spatially-modulated light.

Item 41. A LIDAR system as defined in item 39 or 40 wherein the angular magnification system is arranged to receive the spatially modulated light at a first angle and output the spatially modulated light at a second angle, wherein the second angle is greater than the first angle.

Item 42. A LIDAR system as defined in any preceding item wherein the first characteristic is amplitude modulation at a first frequency.

Item 43. A LIDAR system as defined in any preceding item wherein the light is pulsed.

Item 44. A LIDAR system as defined in any preceding item wherein the spatial light modulator is a liquid crystal on silicon, "LCOS", spatial light modulator.

Item 45. A LIDAR system as defined in any preceding item wherein each computer-generated hologram comprises first holographic data defining the size and shape of the light footprint and second holographic data defining the position of the light footprint in the scene.

Item 46. A LIDAR system as defined in any preceding item wherein the first holographic data comprises a lensing function.

Item 47. A LIDAR system as defined in any preceding item wherein the second holographic data comprises a grating function.

Item 48. A LIDAR system as defined in any preceding item further comprising a processor arranged to determine a distance of an object in the scene from the LIDAR system by measuring a time difference between output of first spatially-modulated light, corresponding to a first computer-generated hologram of the plurality of computer-generated holograms, and detection of first spatially-modulated light reflected from the object.

Item 49. A LIDAR system as defined in any preceding item wherein the light detector comprises one of: a single light detecting element or an array of light detecting elements.

Item 50. A LIDAR system as defined in any preceding item wherein at least one of the SLM and the light detector is located within a lamp unit of a portable device or vehicle.

Item 51. A lamp unit comprising the LIDAR system of any preceding item.

Item 52. A vehicle comprising the LIDAR system of any preceding item.

The invention claimed is:

1. A light detection and ranging, "LIDAR", system arranged to scan a scene, the system comprising:
    a light source arranged to output light having a first characteristic;
    a spatial light modulator, "SLM", arranged to receive the light from the light source and output spatially-modulated light in accordance with computer-generated holograms represented on the spatial light modulator;
    a holographic controller arranged to output a plurality of computer-generated holograms to the spatial light modulator, wherein each computer-generated hologram is arranged to form a corresponding light footprint within the scene and the holographic controller is further arranged to change the position of the light footprint within the scene; and
    a light detector arranged to receive light having the first characteristic from the scene and output a light response signal,
    wherein the plurality of computer-generated holograms comprise a first computer-generated hologram arranged to form a first light footprint at a first position in the scene and a second computer-generated hologram arranged to form a second light footprint at a second position in the scene, wherein output of the second computer-generated hologram immediately follows output of the first computer-generated hologram, and wherein the first light footprint has a first area and the second light footprint has a second area, wherein the first area is not equal to the second area.

2. A LIDAR system as claimed in claim 1, wherein the plurality of computer-generated holograms comprise a first plurality of computer-generated holograms arranged to provide a first scan within the scene, and wherein the holographic controller is arranged to receive the light response signal in response to the first scan and determine a second plurality of computer-generated holograms based on a property of the light response signal in response to the first scan.

3. A LIDAR system as claimed in claim 2 wherein the second plurality of computer-generated holograms are arranged to provide a second scan within the scene, wherein the first scan is a scan of a first area of the scene and the second scan is a scan of a second area of the scene.

4. A LIDAR system as claimed in claim 1 wherein the first light footprint has a one-dimensional shape extending in a second direction and the second light footprint has a one-dimensional shape extending in a first direction.

5. A LIDAR system as claimed in claim 1 wherein the light footprint is continuously repositioned so as to scan the light footprint within the scene.

6. A LIDAR system as claimed in claim 1 wherein one or more of the following conditions (1)-(3) is met:
    (1) the first light footprint has a first shape and the second light footprint has a second shape, wherein the first shape is different to the second shape;
    (2) the first light footprint has a shape having a first orientation and the second light footprint has a shape having a second orientation, wherein the first orientation is different to the second orientation; and
    (3) the first position is spatially separated from the second position.

7. A LIDAR system as claimed in claim 1 wherein each computer-generated hologram is a phase-only hologram.

8. A LIDAR system as claimed in claim 1 wherein the spatially modulated light output by the SLM is encoded with a code that is unique to the LIDAR system.

9. A LIDAR system as claimed in claim 8 wherein the spatially modulated light output by the SLM is encoded by modulation of the light amplitude.

10. A LIDAR system as claimed in claim 1 comprising first and second light sources configured to output light of different wavelengths to the SLM.

11. A LIDAR system as claimed in claim 1 wherein the light footprint, or a parameter or element associated with the plurality of computer-generated holograms that form the light footprint, is determined based on a received signal.

12. A LIDAR system as claimed in claim 11 wherein the received signal provides an indication of at least one of: vehicle speed; ambient conditions; weather conditions; traffic conditions and other driving parameters.

13. A LIDAR system as claimed in claim 1 wherein the light footprint, or a parameter associated with the plurality of computer-generated holograms that form the light footprint, is determined so as to focus the light footprint at a distance corresponding to a distance range.

14. A LIDAR system as claimed in claim 1 further comprising an angular magnification system arranged to magnify the angular deflection of the spatially-modulated light from the spatial light modulator, wherein the angular magnification system is arranged to receive the spatially modulated light at a first angle and output the spatially modulated light at a second angle, wherein the second angle is greater than the first angle.

15. A LIDAR system as claimed in claim 1 wherein the first characteristic is amplitude modulation at a first frequency.

16. A LIDAR system as claimed in claim 1 wherein each computer-generated hologram comprises first holographic data defining the size and shape of the light footprint and second holographic data defining the position of the light footprint in the scene.

17. A LIDAR system as claimed in claim 1 wherein the first holographic data comprises a lensing function, and wherein the second holographic data comprises a grating function.

18. A LIDAR system as claimed in claim 1 further comprising a processor arranged to determine a distance of an object in the scene from the LIDAR system by measuring a time difference between output of first spatially-modulated light, corresponding to a first computer-generated hologram of the plurality of computer-generated holograms, and detection of first spatially-modulated light reflected from the object.

19. A LIDAR system as claimed in claim 1 wherein at least one of the SLM and the light detector is located within a lamp unit of a portable device or vehicle.

20. A lamp unit comprising the LIDAR system of claim 1.

21. A vehicle comprising the LIDAR system of claim 1.

22. A method for scanning a scene using LIDAR, the method comprising:

providing light having a first characteristic;
receiving the light having the first characteristic on a spatial light modulator;
providing a plurality of computer-generated holograms to the spatial light modulator and representing the plurality of computer-generated holograms on the spatial light modulator,
outputting spatially-modulated light having the first characteristic from the spatial light modulator in accordance with the plurality of computer-generated holograms to provide a light footprint within the scene, the plurality of spatially-modulated holograms changing a position of the light footprint within the scene; and
receiving light having the first characteristic from the scene at a light detector and outputting a light response signal from the light detector,
wherein the plurality of computer-generated holograms comprise a first computer-generated hologram arranged to form a first light footprint at a first position in the scene and a second computer-generated hologram arranged to form a second light footprint at a second position in the scene, wherein output of the second computer-generated hologram immediately follows output of the first computer-generated hologram, and wherein the first light footprint has a first area and the second light footprint has a second area, wherein the first area is not equal to the second area.

* * * * *